US008569407B2

(12) United States Patent
Leung et al.

(10) Patent No.: US 8,569,407 B2
(45) Date of Patent: Oct. 29, 2013

(54) BIODEGRADABLE MATERIAL COMPOSED OF A POLYMER COMPRISING A POROUS METAL-ORGANIC FRAMEWORK

(75) Inventors: Emi Leung, Somerset, NJ (US); Ulrich Müller, Neustadt (DE); Jan Kurt Walter Sandler, Heidelberg (DE); Gabriel Skupin, Speyer (DE); Motonori Yamamoto, Mannheim (DE); Antje Van der Net, Kassel (DE)

(73) Assignee: BASF SE, Ludwigshafen (DE)

( * ) Notice: Subject to any disclaimer, the term of this patent is extended or adjusted under 35 U.S.C. 154(b) by 57 days.

(21) Appl. No.: 13/257,787

(22) PCT Filed: Mar. 17, 2010

(86) PCT No.: PCT/EP2010/053467

§ 371 (c)(1), (2), (4) Date: Sep. 20, 2011

(87) PCT Pub. No.: WO2010/106105

PCT Pub. Date: Sep. 23, 2010

(65) Prior Publication Data

US 2012/0016066 A1 Jan. 19, 2012

(30) Foreign Application Priority Data

Mar. 20, 2009 (EP) .................................... 09155687

(51) Int. Cl.

*C08K 5/098* (2006.01)
*B26D 7/27* (2006.01)
*C08L 67/02* (2006.01)

(52) U.S. Cl.

USPC .......................................... 524/174; 524/301

(58) Field of Classification Search

USPC ................................................ 524/174, 301
See application file for complete search history.

(56) References Cited

U.S. PATENT DOCUMENTS

| | | | |
|---|---|---|---|
| 5,648,508 | A | 7/1997 | Yaghi |
| 5,817,721 | A | 10/1998 | Warzelhan et al. |
| 5,863,991 | A | 1/1999 | Warzelhan et al. |
| 5,880,220 | A | 3/1999 | Warzelhan et al. |
| 5,883,199 | A | 3/1999 | McCarthy et al. |
| 5,889,135 | A | 3/1999 | Warzelhan et al. |

(Continued)

FOREIGN PATENT DOCUMENTS

| | | |
|---|---|---|
| DE | 19954404 | 5/2001 |
| DE | 10111230 | 9/2002 |

(Continued)

OTHER PUBLICATIONS

PCT IPRP in PCT/EP2010/053467, mailed Sep. 22, 2011, 6 pgs.

(Continued)

*Primary Examiner* — John Uselding
(74) *Attorney, Agent, or Firm* — Servilla Whitney LLC

(57) ABSTRACT

The present invention relates to a biodegradable material in the form of a foil or a film, where the material comprises a polymer comprising at least one porous metal-organic framework and the at least one porous metal-organic framework comprises at least one at least bidentate organic compound coordinated to at least one metal ion. The invention further relates to food packaging comprising such a material and also its use for the packaging of foods and the use of a porous metal-organic framework for the absorption of ethene in food packaging.

17 Claims, 1 Drawing Sheet

(56) References Cited

U.S. PATENT DOCUMENTS

| | | | | |
|---|---|---|---|---|
| 6,111,058 | A | 8/2000 | Warzelhan et al. | |
| 6,120,895 | A | 9/2000 | Kowitz et al. | |
| 6,258,924 | B1 | 7/2001 | Warzelhan et al. | |
| 6,303,677 | B1 | 10/2001 | Warzelhan et al. | |
| 6,353,084 | B1 | 3/2002 | Warzelhan et al. | |
| 7,119,219 | B2 | 10/2006 | Mueller et al. | |
| 7,534,303 | B2 | 5/2009 | Mueller et al. | |
| 7,815,716 | B2 | 10/2010 | Mueller et al. | |
| 7,968,739 | B2 | 6/2011 | Mueller et al. | |
| 8,003,731 | B2 | 8/2011 | Seeliger et al. | |
| 2004/0097670 | A1 * | 5/2004 | Nagy et al. | 526/151 |
| 2008/0161449 | A1 | 7/2008 | Yamamoto et al. | |
| 2008/0227634 | A1 | 9/2008 | Muller et al. | |
| 2009/0137756 | A1 * | 5/2009 | Pequeno et al. | 526/126 |
| 2009/0183996 | A1 | 7/2009 | Richter et al. | |
| 2010/0166644 | A1 | 7/2010 | Schubert et al. | |
| 2011/0178335 | A1 * | 7/2011 | Leung et al. | 562/607 |

FOREIGN PATENT DOCUMENTS

| | | |
|---|---|---|
| DE | 10355087 | 6/2005 |
| DE | 102005053430 | 5/2007 |
| EP | 0790253 | 8/1997 |
| EP | 1106233 | 6/2001 |
| EP | 0792309 | 9/2002 |
| EP | 1525802 | 4/2005 |
| EP | 1702925 | 9/2006 |
| WO | WO-92/09654 | 6/1992 |
| WO | WO-96/15173 | 5/1996 |
| WO | WO-96/15174 | 5/1996 |
| WO | WO-96/15175 | 5/1996 |
| WO | WO-96/15176 | 5/1996 |
| WO | WO-96/21689 | 7/1996 |
| WO | WO-96/21690 | 7/1996 |
| WO | WO-96/21691 | 7/1996 |
| WO | WO-96/21692 | 7/1996 |
| WO | WO-96/25446 | 8/1996 |
| WO | WO-96/25448 | 8/1996 |
| WO | WO-98/12242 | 3/1998 |
| WO | WO-2005/003622 | 1/2005 |
| WO | WO-2005/017034 | 2/2005 |
| WO | WO-2005/049892 | 6/2005 |
| WO | WO-2006/074815 | 7/2006 |
| WO | WO-2007/023134 | 3/2007 |
| WO | WO-2007/054581 | 5/2007 |
| WO | WO-2007/131955 | 11/2007 |

OTHER PUBLICATIONS

"Machine Translation of DE102005053430", May 16, 2007 , 13 pages.
"Machine Translation of DE19954404", May 17, 2001 , 15 pages.
"Machine Translation of EP1106233", Jun. 13, 2001 , 6 pages.
"Machine Translation of EP1525802", May 27, 2005 , 6 pages.
"Machine Translation of WO96/15176", May 23, 1996 , 16 pages.
"PCT International Search Report for PCT/EP2010/053467", Oct. 26, 2010, 2 pages.
Chen, Banglin et al., "Interwoven Metal-Organic Framework on a Periodic Minimal Surface with Extra-Large Pores", *Science*, vol. 291 Feb. 9, 2001, 4 pages.
Eddaoudi, Mohamed et al., "Design and Synthesis of Metal-Carboxylate Frameworks with Permanent Microporosity", *Topics in Catalysis* 9 1999, pages 105-111.
Li, Hallian et al., "Design and Synthesis of an Exceptionally Stable and Highly Porous Metal-Organic Framework", *Nature*, vol. 402 Nov. 18, 1999, 6 pages.
O'Keeffe, M. et al., "Section 1:Tutorial—Frameworks for Extended Solids: Geometrical Design Principles", *Journal of Solid State Chemistry* 152 2000, pp. 3-20.
Sudik, Andrea C. et al., "Design, Synthesis, Structure, and Gas (N2, Ar, CO2, CH4, and H2) Sorption Properties of Porous Metal-Organic Tetrahedral and Heterocuboidal Polyhedra", *Journal of American Chemical Society* 2005, pp. 7110-7118.

* cited by examiner

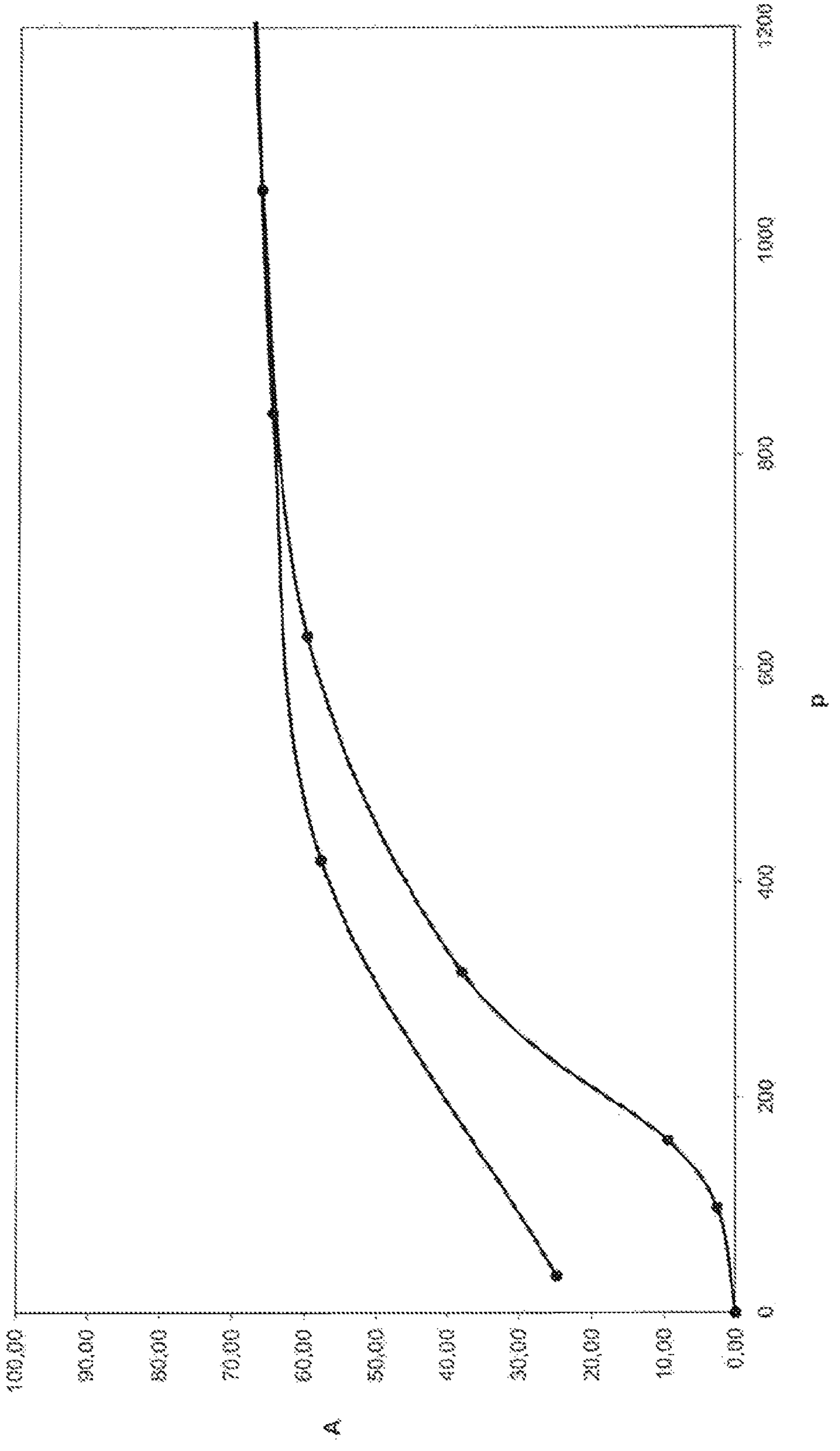
A
100.00
90.00
80.00
70.00
60.00
50.00
40.00
30.00
20.00
10.00
0.00
0
200
400
600
800
1000
1200
p

BIODEGRADABLE MATERIAL COMPOSED OF A POLYMER COMPRISING A POROUS METAL-ORGANIC FRAMEWORK

CROSS-REFERENCE TO RELATED APPLICATIONS

This application is the National Stage entry of PCT/EP2010/053467, filed on Mar. 17, 2010, which claims priority to European Patent application number 09155687.8, filed on Mar. 20, 2009, both of which are incorporated herein by reference in their entireties.

FIELD

The present invention relates to a biodegradable material in the form of a foil or a film, food packaging comprising such a material and also its use.

BACKGROUND

It is known that ethene can accelerate the ripening of foods such as fruit and vegetables. This is exploited by carrying out an ethene treatment for the targeted ripening of, for example, fruit. Equally, the emission of ethene by the fruit itself into the environment during transport is disadvantageous.

Attempts are therefore made to remove the ethene liberated from the surrounding gas again from foods such as fruit, if the food is present in a closed compartment such as packaging. Various absorbents have been proposed for this purpose in the literature. Absorbents mentioned here are, for example, activated carbon, zeolites or silica.

Thus, for example, EP-A 1 106 233 describes a process for the adsorption of ethylene from gases over an organophilic zeolite as absorbent for the storage and transport of easily perishable fruits, plants and vegetables, where the storage and transport takes place in virtually closed spaces.

Furthermore, EP-A 1 525 802 proposes inhibiting the ripening process, in particular fruit, using a foil comprising a zeolite for packaging.

In addition, in terms of environmental politics, such packaging materials like foils have to meet the requirement that they are easy to dispose of or to recycle. Owing to the high demands made of packaging materials for food such as fruit and vegetables from a food technology point of view, biodegradable materials are particularly preferred. Packaging materials such as foils composed of biodegradable polymers are likewise known in the prior art. Thus, for example, WO-A 2005/017034 and WO-A 2006/074815 describe such biodegradable polyester mixtures.

Despite the materials known in the prior art for use in conjunction with food, there continues to be a need for alternative materials.

SUMMARY

According to one or more embodiments, provided is a biodegradable material in the form of a foil or a film, where the material comprises a polymer comprising at least one porous metal-organic framework and the at least one porous metal-organic framework comprises at least one at least bidentate organic compound coordinated to at least one metal ion. Certain embodiments relate to food packaging comprising such a material and also its use for the packaging of foods, as well as the use of a porous metal-organic framework for the absorption of ethene in food packaging.

BRIEF DESCRIPTION OF THE DRAWING

FIG. 1 shows the ethene absorption at 298 K of a framework in accordance with one or more embodiments of the invention.

DETAILED DESCRIPTION

It is therefore an object of the present invention to provide such alternative materials which firstly inhibit the undesirable ripening process during storage or transport of foods and also satisfy the requirements for environmental compatibility of the packaging used for the foods.

The object is achieved by a biodegradable material in the form of a foil or a film, where the material comprises a polymer comprising at least one porous metal-organic framework and the at least one porous metal-organic framework comprises at least one at least bidentate organic compound coordinated to at least one metal ion.

It has been found that biodegradable polymers which are known per se can particularly advantageously comprise porous metal-organic frameworks as additive in said polymer for the absorption of ethylene, and the desired absorption can occur in this way.

Biodegradable materials in the form of a foil or a film comprising a polymer are known in the prior art. Their use as packaging material has also been described.

Here, for example, foils having a thickness of preferably less than 100 μm can be used. The thickness of a film can also be matched to the respective use. However, the biodegradable material is preferably a foil. The foil or film more preferably has a thickness of less than 50 μm, in particular of less than 25 μm.

For the purposes of the present invention, a polymeric material is biodegradable when it is completely biodegradable in accordance with DIN EN 13432, part 2, which is the case when at least 90% of the organic carbon of the material has been converted during a test time of not more than 180 days.

The polymer is preferably a polyester based on aliphatic and aromatic dicarboxylic acids and aliphatic dihydroxy compounds. Such materials are marketed, inter alia, under the trade name Ecoflex® by BASF SE.

Examples of polymers are described in the form of mixtures in WO-A 2005/017034 and WO-A 2006/074815.

Accordingly, the preferred polyesters based on aliphatic and aromatic dicarboxylic acids and aliphatic dihydroxy compounds can be present as such or as component i as described below.

Biodegradable mixtures of i) synthetic polyester materials and ii) homopolyesters or copolyesters selected from the group consisting of polylactide, polycaprolactone, polyhydroxyalkanoates and polyesters derived from aliphatic dicarboxylic acids and aliphatic diols are known (see EP-B 792 309). Such mixtures ideally combine the desirable properties of the individual components, for example the generally good processing and mechanical properties of synthetic polyesters with the usually cheaper availability and ecologically acceptable preparation and disposal of the polymers listed above under ii), e.g. polylactide, polycaprolactone, polyhydroxyalkanoates and polyesters derived from aliphatic dicarboxylic acids and aliphatic diols.

The above-described polyesters i) and ii) can be used separately or as a mixture. The same applies to the component iii) which is described in more detail below. Preference is given to the polymers i) and mixtures with these. Mixtures of the polymers i), ii) and iii) are preferentially discussed below, but the same also applies, for the purposes of the present invention, when only one polymer, for example polymer i), is present as part of the biodegradable material.

Possible components i for the production of the biodegradable polyester mixtures are in principle all polyesters based on aliphatic and aromatic dicarboxylic acids and aliphatic dihydroxy compounds, known as partially aromatic polyesters. Mixtures of a plurality of such polyesters are of course also suitable as component i.

For the purposes of the invention, partially aromatic polyesters also encompass polyester derivatives such as polyether esters, polyesteramides or polyether esteramides. Suitable partially aromatic polyesters include linear polyesters which have not been chain extended (WO 92/09654). Preference is given to chain-extended and/or branched partially aromatic polyesters. The latter are known from the documents mentioned above, WO 96/15173 to 15176, 21689 to 21692, 25446, 25448 or WO 98/12242, which are hereby expressly incorporated by reference. Mixtures of different partially aromatic polyesters are likewise possible. Among partially aromatic polyesters, particular mention may be made of products such as Ecoflex® (BASF Aktiengesellschaft) and Eastar® Bio (Novamont).

Particularly preferred partially aromatic polyesters include polyesters comprising, as significant components, A) an acid component comprising
  a1) from 30 to 99 mol % of at least one aliphatic dicarboxylic acid or at least one cycloaliphatic dicarboxylic acid or ester-forming derivatives thereof or mixtures thereof,
  a2) from 1 to 70 mol % of at least one aromatic dicarboxylic acid or ester-forming derivative thereof or mixtures thereof and
  a3) from 0 to 5 mol % of a compound comprising sulfonate groups,
B) a diol component selected from among at least one $C_2$-$C_{12}$-alkanediol and at least one $C_5$-$C_{10}$-cycloalkanediol and mixtures thereof and also, if desired, one or more components selected from among
C) a component selected from among
  c1) at least one dihydroxy compound comprising ether functions and having the formula I $$HO—[(CH_2)_n—O]_m—H \quad (I)$$

where n is 2, 3 or 4 and m is an integer from 2 to 250,
  c2) at least one hydroxy carboxylic acid of the formula IIa or IIb (IIa)

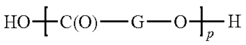

(IIb)

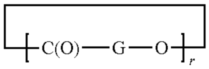

where p is an integer from 1 to 1500 and r is an integer from 1 to 4 and G is a radical selected from the group consisting of phenylene, $—(CH_2)_q—$, where q is an integer from 1 to 5, —C(R)H— and $—C(R)HCH_2$, where R is methyl or ethyl,
  c3) at least one amino-$C_2$-$C_{12}$-alkanol or at least one amino-$C_5$-$C_{10}$-cycloalkanol or mixtures thereof,
  c4) at least one diamino-$C_1$-$C_8$-alkane,
  c5) at least one 2,2'-bisoxazoline of the general formula III (III)

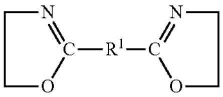

where $R^1$ is a single bond, a $(CH_2)_z$ alkylene group, where z=2, 3 or 4, or a phenylene group,
  c6) at least one aminocarboxylic acid selected from the group consisting of natural amino acids, polyamides obtainable by polycondensation of a dicarboxylic acid having from 4 to 6 carbon atoms and a diamine having from 4 to 10 carbon atoms, compounds of the formulae IVa and IVb (IVa)

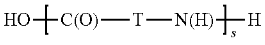

(IVb)

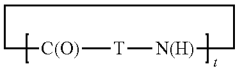

where s is an integer from 1 to 1500 and t is an integer from 1 to 4 and T is a radical selected from the group consisting of phenylene, $—(CH_2)_u—$, where u is an integer from 1 to 12, $—C(R^2)H—$ and $—C(R^2)HCH_2$, where $R^2$ is methyl or ethyl,
  and polyoxazolines having the repeated unit V (V)

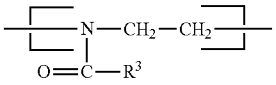

where $R^3$ is hydrogen, $C_1$-$C_6$-alkyl, $C_5$-$C_8$-cycloalkyl, unsubstituted phenyl or phenyl substituted by up to three $C_1$-$C_4$-alkyl groups or is tetrahydrofuryl,
  or mixtures of c1 to c6
  and
D) a component selected from among
  d1) at least one compound having at least three groups capable of ester formation,
  d2) at least one isocyanate,
  d3) at least one divinyl ether
  and mixtures of d1) to d3).

The acid component A of the partially aromatic polyesters comprises, in a preferred embodiment, from 30 to 70 mol %, in particular from 40 to 60 mol %, of a1 and from 30 to 70 mol %, in particular from 40 to 60 mol %, of a2.

As aliphatic acids and the corresponding derivatives a1, it is generally possible to use those having from 2 to 10 carbon atoms, preferably from 4 to 6 carbon atoms. They can be either linear or branched. The cycloaliphatic dicarboxylic acids which can be used for the purposes of the present invention are generally those having from 7 to 10 carbon atoms and in particular those having 8 carbon atoms. However, it is in principle also possible to use dicarboxylic acids having a larger number of carbon atoms, for example up to 30 carbon atoms.

Mention may be made by way of example of: malonic acid, succinic acid, glutaric acid, 2-methylgiutaric acid, 3-methyglutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid and 2,5-norbornanedicarboxylic acid.

As ester-forming derivatives of the abovementioned aliphatic or cycloaliphatic dicarboxylic acids which can likewise be used, particular mention may be made of the di-$C_1$-$C_6$-alkyl esters, e.g. dimethyl, diethyl, di-n-propyl, diisopropyl, di-n-butyl, diisobutyl, di-t-butyl, di-n-pentyl, diisopentyl or di-n-hexyl esters. Anhydrides of the dicarboxylic acids can likewise be used.

The dicarboxylic acids or their ester-forming derivatives can here be used either individually or as a mixture of two or more thereof.

Preference is given to using succinic acid, adipic acid, azelaic acid, sebacic acid, brassylic acid or their respective ester-forming derivatives or mixtures thereof. Particular preference is given to using succinic acid, adipic acid or sebacic acid or their respective ester-forming derivatives or mixtures thereof. Particular preference is given to using adipic acid or its ester-forming derivatives, e.g. its alkyl esters, or mixtures thereof. Sebacic acid or mixtures of sebacic acid with adipic acid are preferably used as aliphatic dicarboxylic acid when polymer mixtures having “hard” or “brittle” components ii), for example polyhydroxybutyrate or in particular polylactide are produced. Succinic acid or mixtures of succinic acid with adipic acid are preferably used as aliphatic dicarboxylic acid when polymer mixtures having “soft” or “tough” components ii), for example polyhydroxybutyrate-co-valerate, are produced.

In addition, succinic acid, azelaic acid, sebacic acid and brassylic acid have the advantage that they can be obtained as renewable raw materials.

Possible aromatic dicarboxylic acids a2 are in general those having from 8 to 12 carbon atoms and preferably those having 8 carbon atoms. Mention may be made by way of example of terephthalic acid, isophthalic acid, 2,6-naphthoic acid and 1,5-naphthoic acid and also ester-forming derivatives thereof. Particular mention may here be made of the di-$C_1$-$C_6$-alkyl esters, e.g. dimethyl, diethyl, di-n-propyl, diisopropyl, di-n-butyl, diisobutyl, di-t-butyl, di-n-pentyl, diisopentyl or di-n-hexyl esters. The anhydrides of the dicarboxylic acids a2 are likewise suitable ester-forming derivatives.

However, aromatic dicarboxylic acids a2 having a larger number of carbon atoms, for example up to 20 carbon atoms, can in principle also be used.

The aromatic dicarboxylic acids or their ester-forming derivatives a2 can be used either individually or as a mixture of two or more thereof. Particular preference is given to using terephthalic acid or its ester-forming derivatives such as dimethyl terephthalate.

As compound comprising sulfonate groups, use is usually made of an alkali metal or alkaline earth metal salt of a dicarboxylic acid comprising sulfonate groups or ester-forming derivatives thereof, preferably alkali metal salts of 5-sulfoisophthalic acid or mixtures thereof, particularly preferably the sodium salt.

In a preferred embodiment, the acid component A comprises from 40 to 60 mol % of a1, from 40 to 60 mol % of a2 and from 0 to 2 mol % of a3. In a further preferred embodiment, the acid component A comprises from 40 to 59.9 mol % of a1, from 40 to 59.9 mol % of a2 and from 0.1 to 1 mol % of a3, in particular from 40 to 59.8 mol % of a1, from 40 to 59.8 mol % of a2 and from 0.2 to 0.5 mol % of a3.

In general, the diols B are selected from among branched or linear alkanediols having from 2 to 12 carbon atoms, preferably from 4 to 6 carbon atoms, and cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol and 2,2-dimethyl-1,3-propanediol (neopentyl glycol); cyclopentanediol, 1,4-cyclohexanediol, 1,2-cyclohexanedimethanol, 1,3-cyclohexane-dimethanol, 1,4-cyclohexanedimethanol or 2,2,4,4-tetramethyl-1,3-cyclobutanediol. Particular preference is given to 1,4-butanediol, in particular in combination with adipic acid as component a1), and 1,3-propanediol, in particular in combination with sebacic acid as component a1). 1,3-Propanediol has the additional advantage that it is available as renewable raw material. It is also possible to use mixtures of various alkanediols.

Depending on whether an excess of acid or OH end groups is desired, either the component A or the component B can be used in excess. In a preferred embodiment, the molar ratio of the components A:B used can be in the range from 0.4:1 to 1.5:1, preferably in the range from 0.6:1 to 1.1:1.

Apart from the components A and B, the polyesters on which the polyester mixtures according to the invention are based can comprise further components.

As dihydroxy compounds c1, preference is given to using diethylene glycol, triethylene glycol, polyethylene glycol, polypropylene glycol and polytetrahydrofuran (polyTHF), particularly preferably diethylene glycol, triethylene glycol and polyethylene glycol, with it also being possible to use mixtures thereof or compounds which have different variables n (see formula I), for example polyethylene glycol comprising propylene units (n=3), which can be obtained, for example, by polymerization by methods know per se of firstly ethylene oxide and subsequently using propylene oxide, particularly preferably a polymer based on polyethylene glycol having different variables n, where units formed from ethylene oxide predominate. The molecular weight ($M_n$) of the polyethylene glycol is generally selected in the range from 250 to 8000 g/mol, preferably from 600 to 3000 g/mol.

In one of the preferred embodiments, it is possible to use, for example, from 15 to 98 mol %, preferably from 60 to 99.5 mol %, of diols B and from 0.2 to 85 mol %, preferably from 0.5 to 30 mol %, of dihydroxy compounds c1, based on the molar amount of B and c1, for preparing the partially aromatic polyesters.

In a preferred embodiment, the hydroxycarboxylic acid c2) used is: glycolic acid, D-, L-, D,L-lactic acid, 6-hydroxyhexanoic acid, cyclic derivatives thereof, e.g. glycolide (1,4-dioxane-2,5-dione), D-, L-dilactide (3,6-dimethyl-1,4-dioxane-2,5-dione), p-hydroxybenzoic acid and oligomers and polymers thereof, e.g. 3-polyhydroxybutyric acid, polyhydroxyvaleric acid, polylactide (obtainable, for example, as EcoPLA® 2000D (from Cargill)) or a mixture of 3-polyhydroxybutyric acid and polyhydroxyvaleric acid (the latter is obtainable under the name Biopol® from Zeneca); the low molecular weight and cyclic derivatives thereof are particularly preferred for the preparation of partially aromatic polyesters.

The hydroxycarboxylic acids can be used, for example, in amounts of from 0.01 to 50% by weight, preferably from 0.1 to 40% by weight, based on the amount of A and B.

As amino-$C_2$-$C_{12}$-alkanol or amino-$C_6$-$C_{10}$-cycloalkanol (component c3), which for the present purposes also includes 4-aminomethylcyclohexanemethanol, preference is given to using amino-$C_2$-$C_6$-alkanols such as 2-aminoethanol, 3-aminopropanol, 4-aminobutanol, 5-aminopentanol, 6-aminohexanol and also amino-$C_6$-$C_6$-cyloalkanols such as aminocyclopentanol and aminocyclohexanol or mixtures thereof.

As diamino-$C_1$-$C_8$-alkane (component c4), preference is given to using diamino-$C_4$-$C_6$-alkanes such as 1,4-diaminobutane, 1,5-diaminopentane and 1,6-diaminohexane (hexamethylenediamine, "HMD").

In a preferred embodiment, it is possible to use from 0.5 to 99.5 mol %, preferably from 0.5 to 50 mol %, of c3, based on the molar amount of B, and from 0 to 50 mol %, preferably from 0 to 35 mol %, of c4, based on the molar amount of B, for the preparation of the partially aromatic polyesters.

The 2,2'-bisoxazolines c5 of the general formula III can generally be obtained by the process from Angew. Chem. Int. Edit., Vol. 11 (1972), pp. 287-288. Particularly preferred bisoxazolines are those in which $R^1$ is a single bond, a $(CH_2)_z$ alkylene group, where z=2, 3 or 4, e.g. methylene, ethane-1,2-diyl, propane-1,3-diyl, propane-1,2-diyl, or a phenylene group. As particularly preferred bisoxazolines, mention may be made of 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)-benzene.

To prepare the partially aromatic polyesters, it is possible to use, for example, from 70 to 98 mol % of B, up to 30 mol % of c3 and from 0.5 to 30 mol % of c4 and from 0.5 to 30 mol % of c5, in each case based on the sum of the molar amounts of the components B, c3, c4 and c5. In another preferred embodiment, it is possible to use from 0.1 to 5% by weight, preferably from 0.2 to 4% by weight, of c5, based on the total weight of A and B.

As component c6, it is possible to use natural aminocarboxylic acids. These include valine, leucine, isoleucine, threonine, methionine, phenylalanine, tryptophane, lysine, alanine, arginine, aspartic acid, cysteine, glutamic acid, glycine, histidine, proline, serine, tryosine, asparagine or glutamine.

Preferred aminocarboxylic acids of the general formulae IVa and IVb are those in which s is an integer from 1 to 1000 and t is an integer from 1 to 4, preferably 1 or 2, and T is selected from the group consisting of phenylene and $-(CH_2)_u-$, where u is 1, 5 or 12.

Furthermore, c6 can also be a polyoxazoline of the general formula V. It is also possible for c6 to be a mixture of various aminocarboxylic acids and/or polyoxazolines.

In a preferred embodiment, c6 can be used in amounts of from 0.01 to 50% by weight, preferably from 0.1 to 40% by weight, based on the total amount of the components A and B.

Further components which can optionally by used for preparing the partially aromatic polyesters include compounds d1 which comprise at least three groups capable of ester formation.

The compounds d1 preferably comprise from three to ten functional groups which are capable of forming ester bonds. Particularly preferred compounds d1 have from three to six functional groups of this type in the molecule, in particular from three to six hydroxyl groups and/or carboxyl groups. Examples which may be mentioned are:

tartaric acid, citric acid, malic acid;
trimethylolpropane, trimethylolethane;
pentaerythritol;
polyether triols;
glycerol;
trimesic acid;
trimellitic acid, trimellitic anhydride;
pyromellitic acid, pyromellitic dianhydride and
hydroxyisophthalic acid.

The compounds d1 are generally used in amounts of from 0.01 to 15 mol %, preferably from 0.05 to 10 mol %, particularly preferably from 0.1 to 4 mol %, based on the component A.

As component d2, use is made of an isocyanate or a mixture of various isocyanates. It is possible to use aromatic or aliphatic diisocyanates. However, higher-functional isocyanates can also be used.

An aromatic diisocyanate d2 is, for the purposes of the invention, in particular Tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate or xylylene diisocyanate.

Among these, particular preference is given to diphenylmethane 2,2'-, 2,4'- and 4,4'-diisocyanate as component d2. In general, the latter diisocyanates are used as a mixture.

A possible three-ring isocyanate d2 is tri(4-isocyanatophenyl)methane. The multiring aromatic diisocyanates are obtained, for example, in the preparation of one- or two-ring diisocyanates.

The component d2 can also comprise urethione groups, for example for capping the isocyanate groups, in minor amounts, e.g. up to 5% by weight, based on the total weight of the component d2.

For the purposes of the present invention, an aliphatic diisocyanate d2 is, in particular, a linear or branched alkylene diisocyanate or cycloalkylene diisocyanate having from 2 to 20 carbon atoms, preferably from 3 to 12 carbon atoms, e.g. hexamethylene 1,6-diisocyanate, isophorone diisocyanate or methylenebis(4-isocyanatocyclohexane). Particularly preferred aliphatic diisocyanates d2 are hexamethylene 1,6-diisocyanate and isophorone diisocyanate.

Preferred isocyanurates include the aliphatic isocyanurates derived from alkylene diisocyanates or cycloalkylene diisocyanates having from 2 to 20 carbon atoms, preferably from 3 to 12 carbon atoms, e.g. isophorone diisocyanate or methylenebis(4-isocyanatocyclohexane). The alkylene diisocyanates can here be either linear or branched. Particular preference is given to isocyanurates based on n-hexamethylene diisocyanate, for example cyclic trimers, pentamers or higher oligomers of n-hexamethylene diisocyanate.

The component d2 is generally used in amounts of from 0.01 to 5 mol %, preferably from 0.05 to 4 mol %, particularly preferably from 0.1 to 4 mol %, based on the sum of the molar amounts of A and B.

As divinyl ether d3, it is generally possible to use all customary and commercially available divinyl ethers. Preference is given to using 1,4-butanediol divinyl ether, 1,6-hexanediol divinyl ether or 1,4-cyclohexanedimethanol divinyl ether or mixtures thereof.

The divinyl ethers are preferably used in amounts of from 0.01 to 5% by weight, in particular from 0.2 to 4% by weight, based on the total weight of A and B.

Examples of preferred partially aromatic polyesters are based on the following components A, B, d1
A, B, d2
A, B, d1, d2
A, B, d3
A, B, c1
A, B, c1, d3

A, B, c3, c4
A, B, c3, c4, c5
A, B, d1, c3, c5
A, B, c3, d3
A, B, c3, d1
A, B, c1, c3, d3
A, B, c2

Among these, particular preference is given to partially aromatic polyesters based on A, B, d1 or A, B, d2 or on A, B, d1, d2. In another preferred embodiment, the partially aromatic polyesters are based on A, B, c3, c4, c5 or A, B, d1, c3, c5.

The partially aromatic polyesters mentioned and the polyester mixtures according to the invention are generally biodegradable.

For the purposes of the present invention, the feature "biodegradable" for a material or mixture of materials is present when this material or mixture of materials has a percentage biodegradation of at least 60% in at least one of the three methods defined in DIN V 54900-2 (preliminary standard as at September 1998).

In general, the biodegradability leads to the polyester (mixtures) decomposing in a period of time which is appropriate and can be confirmed. Degradation can occur enzymatically, hydrolytically, oxidatively and/or by action of electromagnetic radiation, for example UV radiation, and can usually be brought about predominantly by the action of microorganisms such as bacteria, yeasts, fungi and algae. The biodegradability can be quantified by, for example, mixing the polyester with compost and storing it for a particular time. For example, in accordance with DIN EN 13432 or DIN V 54900-2, method 3, $CO_2$-free air is allowed to flow through matured compost during composting and the compost is subjected to a defined temperature program. Here, the biodegradability is defined as percentage biodegradability via the ratio of the net $CO_2$ liberation from the sample (after subtraction of the $CO_2$ liberation by the compost without sample) to the maximum $CO_2$ liberation from the sample (calculated from the carbon content of the sample). Biodegradable polyester (mixtures) generally display significant degradation phenomena such as growth of fungi and formation of cracks and holes after only a few days of composting.

Other methods of determining the biodegradability are described, for example, in ASTM D 5338 and ASTM D 6400.

The preparation of the partially aromatic polyesters is known per se or can be carried out by known methods.

The preferred partially aromatic polyesters have a molecular weight ($M_a$) in the range from 1000 to 100 000 g/mol, in particular in the range from 9000 to 75 000 g/mol, preferably in the range from 10 000 to 50 000 g/mol, and a melting point in the range from 60 to 170° C., preferably in the range from 80 to 150° C.

The partially aromatic polyesters mentioned can have hydroxyl and/or carboxyl end groups in any desired ratio. The partially aromatic polyesters mentioned can also be end-group-modified. Thus, for example, OH end groups can be acid-modified by reaction with phthalic acid, phthalic anhydride, trimellitic acid, trimellitic anhydride, pyromellitic acid or pyromellitic anhydride.

Suitable components ii of the biodegradable polyester mixtures are basically homopolyesters or copolyesters selected from the group consisting of polylactide, polycaprolactone, polyhydroxyalkanoates and polyesters derived from aliphatic dicarboxylic acids and aliphatic diols. Preferred components ii are polylactide (PLA) and polyhydroxyalkanoates, in particular polyhydroxybutyrate (PHB), polyhydroxybutyrate-co-valerate (PHBV). Products such as NatureWorks® (polylactide from Cargill Dow), Biocycle® (polyhydroxybutyrate from PHB Ind.); Enmat® (polyhydroxybutyrate-co-valerate from Tianan) are of particular importance.

The component iii according to the invention comprises a) a copolymer which comprises epoxide groups and is based on styrene, acrylic esters and/or methacrylic esters, b) a bisphenol A epoxide or c) a natural oil, fatty acid ester or fatty acid amide comprising epoxide groups.

Preference is given to using a copolymer which comprises epoxide groups and is based on styrene, acrylic esters and/or methacrylic esters. In general, the compounds have two or more epoxide groups in the molecule. Oligomeric or polymeric epoxidized compounds, for example, diglycidyl or polyglycidyl esters of dicarboxylic or polycarboxylic acids or diglycidyl or polyglycidyl ethers of diols or polyols or copolymers of styrene and glycidyl (meth)acrylates, for example those marketed by Johnson Polymer under the trade name Joncryl® ADR 4368, are particularly suitable.

Further preferred components iii are compounds which comprise at least one carbon-carbon double or triple bond and at least one epoxide group in the molecule. Glycidyl acrylate and glycidyl methacrylate are particularly suitable.

Further preferred components iii) are c) (epoxidized) natural oils or fatty acid esters comprising epoxide groups. Natural oils are, for example, olive oil, linseed oil, soybean oil, palm oil, peanut oil, coconut oil, tung oil, cod liver oil or a mixture of these compounds. Particular preference is given to epoxidized soybean oil (e.g. Merginat® ESBO from Hobum, Hamburg, or Edenol® B 316 from Cognis, Dusseldorf). The structure types a) and c) are particularly preferably combined as component iii). As described in more detail in the examples, the combination of Joncryl® ADR 4368 (structure type a)) and Merginat® ESBO (structure type c) is particularly preferred.

Component iii) is used in an amount of from 0.1 to 15% by weight, preferably from 0.1 to 10% by weight and particularly preferably from 0.5 to 2% by weight, based on the total weight of the components i) to ii), if mixtures are to be obtained.

The biodegradable polyester mixtures usually comprise from 5 to 90% by weight, preferably from 10 to 85% by weight, particularly preferably from 15 to 80% by weight, in particular from 40 to 60% by weight, of component i and from 10 to 95% by weight, preferably from 15 to 80% by weight, particularly preferably from 40 to 80% by weight, very particularly preferably from 40 to 60% by weight, of component ii, where the percentages by weight are in each case based on the total weight of the components i to ii and add up to 100% by weight.

Polyester mixtures having a high polyhydroxybutyrate (PHB) or in particular polylactide (PLA) content (component ii) can be used for the production of moldings by, for example, injection molding. Mixtures of from 60 to 95% by weight of component can usually be realized here. An improved process for producing impact-modified molding compositions is described under the production processes.

If a polyester comprising sebacic acid or mixtures of sebacic acid with adipic acid as dicarboxylic acid (component a1)) are used as component i), the proportion of the polyester in the mixtures with component ii) can even be reduced below the 10% by weight limit.

The biodegradable polyester mixtures usually further comprise from 0.1 to 15% by weight, preferably from 0.5 to 10% by weight, particularly preferably from 1 to 5% by weight, of component iii, where the percentages by weight are in each case based on the total weight of the components i to ii.

The biodegradable polyester mixtures can comprise further constituents which are known to those skilled in the art but are not essential for the invention. Examples are the additives customary in plastics technology, e.g. stabilizers, neutralizing agents, lubricants and release agents, antiblocking agents, dyes or fillers. In addition, these naturally comprise a metal-organic framework as additive.

The production of the biodegradable polyester mixtures of the invention from the individual components can be carried out by known methods (EP 792 309 and U.S. Pat. No. 5,883, 199).

For example, all components I, ii and iii can be mixed and reacted at elevated temperatures, for example from 120° C. to 250° C., in one process step in mixing apparatuses known to those skilled in the art, for example kneaders or extruders. The reaction is preferably carried out in the presence of a free-radical initiator.

An illustrative process for producing the biodegradable polyester mixtures can comprise the following steps:

In a first step, from 1 to 50% by weight, preferably from 5 to 35% by weight, of component iii is mixed with from 50 to 99% by weight, preferably from 65 to 95% by weight, of component i at temperatures of from 110 to 145° C., preferably from 120 to 140° C., to give a brancher masterbatch. At these temperatures, a homogeneous blend is obtained without an appreciable increase in the molecular weight occurring. The brancher masterbatch obtained in this way can be stored without problems at room temperature. In a second step, the desired composition can be obtained by addition of the brancher masterbatch and, if appropriate, further component i to component ii. This compounding step is carried out at from 150 to 250° C., preferably from 160 to 190° C.

The temperatures in the compounding step can generally be reduced, and decomposition of sensitive biopolymers such as polyhydroxybutyrates can be avoided as a result, by using an activator selected from the group consisting of zinc, tin, titanium compound and $C_1$-$C_{12}$-alkyltriphenylphosphonium halide.

Typical brancher masterbatches comprise from 5 to 35% by weight, preferably from 10 to 20% by weight, of component iii) and from 65 to 95% by weight, preferably from 80 to 90% by weight, of component i. These brancher masterbatches have surprisingly been found to be advantageous compared to corresponding brancher masterbatches comprising components ii) and iii). The brancher masterbatches are provided by the present invention. It is clear from examples 4 to 6 described below that the brancher masterbatches according to the invention comprising the components i) and iii) have advantages over the sometimes commercially available brancher masterbatches (e.g. polylactide and glycidyl methacrylate) in terms of the flow rate of the polyester mixtures formed. In addition, the brancher masterbatches of the invention have excellent storage stability.

Examples of brancher masterbatches according to the invention are:

component i), polyester prepared by condensation of:
- adipic acid/terephthalic acid and 1,4-butanediol (e.g. Ecoflex® FBX 7011);
- adipic acid/terephthalic acid and 1,3-propanediol;
- succinic acid/terephthalic acid and 1,4-butanediol;
- succinic acid/terephthalic acid and 1,3-propanediol;
- sebacic acid/terephthalic acid and 1,4-butanediol;
- sebacic acid/terephthalic acid and 1,3-propanediol;
- azelaic acid/terephthalic acid and 1,4-butanediol;
- brassylic acid/terephthalic acid and 1,4-butanediol; and component iii): glycidyl methacrylate (e.g. Joncryl® ADR 4368 from Johnson Polymer).

To produce polyester mixtures having a high proportion of "hard" or "brittle" component ii), for example >50% by weight of polyhydroxybutyrate or in particular polylactide, the following procedure has been found to be particularly advantageous. An intermediate compound which preferably comprises from 48 to 60% by weight of component i), from 40 to 50% by weight of component ii) and from 0.5 to 2% by weight of component iii) is produced as described above either by mixing the components i), ii) and iii) or in two steps by mixing one of the abovementioned brancher masterbatches with component ii) and, if appropriate, further component i). In an additional step, this intermediate compound is admixed with further component ii) until the desired content of component ii) in the polyester mixture has been attained. The polyester mixture produced by this three-stage process is very suitable for producing biodegradable, impact-modified polyester mixtures.

Sebacic acid or a mixture of sebacic acid with adipic acid is preferably used as aliphatic dicarboxylic acid when polymer mixtures having a high proportion of "hard" or "brittle" component ii), for example polyhydroxybutyrate or in particular polylactide, are produced.

On the basis of experience with other compounds (e.g. development of Ecoflex/starch compounds), the solution formulation was varied by use of a compatibilizer. Instead of incorporating this into the total matrix in a costly fashion, only part of the Ecoflex/PLA formulation is provided with a compatibilizer concentrate. Examples of such a compatibilizer masterbatch are the abovementioned brancher masterbatches and intermediate compounds. This saves compounding costs:

- 9.5-89.5% by weight of Ecoflex, 89.5-9.5% by weight of PLA, 0.5-20% by weight of compatibilizer masterbatch, 0-15% by weight of additives (e.g. palmitates, laurates, stearates, PEG) and from 0 to 50% by weight of fillers (chalk, talc, kaolin, silica, etc.);
- 29.5-59.5% by weight of Ecoflex, 59.5-29.5% by weight of PLA, 0.5-20% by weight of compatibilizer masterbatch, 0-15% by weight of additives (e.g. palmitates, laurates, stearates, PEG) and from 0 to 50% by weight of fillers (chalk, talc, kaolin, silica).

The biodegradable polyester mixtures are particularly suitable for producing moldings, foils or fibers. These can be produced by methods known to those skilled in the art.

The biodegradable polyester mixtures give biodegradable polymer mixtures which can be processed without problems (good bubble stability) to give puncture-resistant foils.

The biodegradable material comprises at least one porous metal-organic framework as additive. This can be introduced by customary methods during the processing of the biodegradable material to produce foils or films.

Such metal-organic frameworks (MOFs) are known in the prior art and are described, for example, in U.S. Pat. No. 5,648,508, EP-A-0 790 253, M. O'Keeffe et al., J. Sol. State Chem., 152 (2000), pages 3 to 20, H. Li et al., Nature 402, (1999), page 276, M. Eddaoudi et al., Topics in Catalysis 9, (1999), pages 105 to 111, B. Chen et al., Science 291, (2001), pages 1021 to 1023, DE-A 101 11 230, DE-A 10 2005 053430, WO-A 2007/054581, WO-A 2005/049892 and WO-A 2007/023134.

As a specific group of these metal-organic frameworks, "limited" frameworks in which the framework does not extend infinitely but forms polyhedra as a result of a specific choice of the organic compound are described in the most recent literature. A. C. Sudik, et al., J. Am. Chem. Soc. 127 (2005), 7110-7118, describes such particular frameworks.

These are described to distinguish them from other frameworks, as metal-organic polyhedra (MOP).

A further specific group of porous metal-organic frameworks are those in which the organic compound as ligand is a monocyclic, bicyclic or polycyclic ring system which is derived from at least one heterocycle selected from the group consisting of pyrrole, alpha-pyridone and gamma-pyridone and has at least two nitrogen atoms in the ring. The electrochemical preparation of such frameworks is described in WO-A 2007/131955.

The general suitability of metal-organic frameworks for the absorption of gases and liquids is described, for example, in WO-A 2005/003622 and EP-A 1 702 925.

These specific groups are particularly suitable for the purposes of the present invention.

The metal-organic frameworks according to the present invention comprise pores, in particular micropores and/or mesopores. Micropores are defined as pores having a diameter of 2 nm or less and mesopores are defined by a diameter in the range from 2 to 50 nm, in each case in accordance with the definition given in Pure & Applied Chem. 57 (1983), 603-619, in particular on page 606. The presence of micropores and/or mesopores can be checked by means of sorption measurements, with these measurements determining the uptake capacity of the MOF for nitrogen at 77 kelvin in accordance with DIN 66131 and/or DIN 66134.

The specific surface area, calculated according to the Langmuir model (DIN 66131, 66134) of an MOF in powder form is preferably more than 100 $m^2/g$, more preferably above 300 $m^2/g$, more preferably more than 700 $m^2/g$, even more preferably more than 800 $m^2/g$, even more preferably more than 1000 $m^2/g$ and particularly preferably more than 1200 $m^2/g$.

Shaped bodies comprising metal-organic frameworks can have a lower active surface area; but preferably more than 150 $m^2/g$, more preferably more than 300 $m^2/g$, even more preferably more than 700 $m^2/g$.

The metal component in the framework according to the present invention is preferably selected from groups Ia, IIa, IIIa, IVa to VIIIa and Ib to VIb. Particular preference is given to Mg, Ca, Sr, Ba, Sc, Y, Ln, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, Al, Ga, In, Tl, Si, Ge, Sn, Pb, As, Sb and Bi, where Ln represents the lanthanides.

Lanthanides are La, Ce, Pr, Nd, Pm, Sm, En, Gd, Tb, Dy, Ho, Er, Tm, Yb.

With regard to the ions of these elements, particular mention may be made of $Mg^{2+}$, $Ca^{2+}$, $Sr^{2+}$, $Ba^{2+}$, $Sc^{3+}$, $Y^{3+}$, $Ln^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$.

Furthermore, particular preference is given to Mg, Al, Y, Sc, Zr, Ti, V, Cr, Mo, Fe, Co, Cu, Ni, Zn, Ln. Greater preference is given to Al, Mo, Y, Sc, Mg, Fe, Cu and Zn. Particular preference is given to Sc, Al, Cu and Zn. Particular preference is given to Cu.

Owing to the use of biodegradable foils or films, particular preference is given to the metals used in the metal-organic framework likewise being biologically acceptable. Particular mention may here be made of Mg, Ca and Al.

The term “at least bidentate organic compound” refers to an organic compound which comprises at least one functional group which is able to form at least two coordinate bonds to a given metal ion and/or a coordinate bond to each of two or more, preferably two, metal atoms.

As functional groups via which the coordinate bonds mentioned can be formed, particular mention may be made of, for example, the following functional groups: $—CO_2H$, $—CS_2H$, $—NO_2$, $—B(OH)_2$, $—SO_3H$, $—Si(OH)_3$, $—Ge(OH)_3$, $—Sn(OH)_3$, $—Si(SH)_4$, $—Ge(SH)_4$, $—Sn(SH)_3$, $—PO_3H$, $—AsO_3H$, $—AsO_4H$, $—P(SH)_3$, $—As(SH)_3$, $—CH(RSH)_2$, $—C(RSH)_3$, $—CH(RNH_2)_2$, $—C(RNH_2)_3$, $—CH(ROH)_2$, $—C(ROH)_3$, $—CH(RCN)_2$, $—C(RCH)_3$, where R is, for example, preferably an alkylene group having 1, 2, 3, 4 or 5 carbon atoms, for example a methylene, ethylene, n-propylene, i-propylene, n-butylene, i-butylene, tert-butylene or n-pentylene group, or an aryl group comprising 1 or 2 aromatic rings, for example $2C_6$ rings, which may, if appropriate, be fused and may be independently substituted by at least one substituent in each case and/or may comprise, independently of one another, at least one heteroatom such as N, O and/or S. In likewise preferred embodiments, functional groups in which the above-mentioned radical R is not present are possible. Such groups are, inter alia, $—CH(SH)_2$, $—C(SH)_3$, $—CH(NH_2)_2$, $—C(NH_2)_3$, $—CH(OH)_2$, $—C(OH)_3$, $—CH(CN)_2$ or $—C(CN)_3$.

However, the functional groups can also be heteroatoms of a heterocycle. Particular mention may here be made of nitrogen atoms.

The at least two functional groups can in principle be any suitable organic compound, as long as it is ensured that the organic compound in which these functional groups are present is capable of forming the coordinate bond and of producing the framework.

The organic compounds which comprise the at least two functional groups are preferably derived from a saturated or unsaturated aliphatic compound or an aromatic compound or a both aliphatic and aromatic compound.

The aliphatic compound or the aliphatic part of the both aliphatic and aromatic compound can be linear and/or branched and/or cyclic, with a plurality of rings per compound also being possible. More preferably, the aliphatic compound or the aliphatic part of the both aliphatic and aromatic compound comprises from 1 to 15, more preferably from 1 to 14, more preferably from 1 to 13, more preferably from 1 to 12, more preferably from 1 to 11 and particularly preferably from 1 to 10, carbon atoms, for example 1, 2, 3, 4, 5, 6, 7, 8, 9 or 10 carbon atoms. Particular preference is here given to, inter alia, methane, adamantane, acetylene, ethylene or butadiene.

The aromatic compound or the aromatic part of the both aromatic and aliphatic compound can have one or more rings, for example two, three, four or five rings, with the rings being able to be separate from one another and/or at least two rings being able to be present in fused form. The aromatic compound or the aromatic part of the both aliphatic and aromatic compound particularly preferably has one, two or three rings, with one or two rings being particularly preferred. Furthermore, each ring of the specified compound can independently comprise at least one heteroatom such as N, O, S, B, P, Si, Al, preferably N, O and/or S. The aromatic compound or the aromatic part of the both aromatic and aliphatic compound more preferably comprises one or two $C_6$ rings which are present either separately or in fused form. Particular mention may be made of benzene, naphthalene and/or biphenyl and/or bipyridyl and/or pyridyl as aromatic compounds.

The at least bidentate organic compound is more preferably an aliphatic or aromatic, acyclic or cyclic hydrocarbon which has from 1 to 18, preferably from 1 to 10 and in particular 6, carbon atoms and additionally has exclusively 2, 3 or 4 carboxyl groups as functional groups.

For example, the at least bidentate organic compound is derived from a dicarboxylic acid such as oxalic acid, succinic acid, tartaric acid, 1,4-butanedicarboxylic acid, 1,4-butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecane-dicarboxylic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidecarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyrane-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1'-diphenyl-3,3'-dicarboxylic acid, 4,4'-diaminodiphenyl-3,3'-dicarboxylic acid, benzidine-3,3'-dicarboxylic acid, 1,4-bis(phenylamino)benzene-2,5-dicarboxylic acid, 1,1'-dinaphthyldicarboxylic acid, 7-chloro-8-methylquinoline-2,3-dicarboxylic acid, 1-anilinoanthraquinone-2,4'-dicarboxylic acid, polytetrahydrofuran 250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2,-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxybenophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diamino(diphenyl ether)diimide-dicarboxylic acid, 4,4'-diaminodiphenylmethanediimidedicarboxylic acid, 4,4'-diamino(diphenyl sulfone)diimidedicarboxylic acid, 1,4-naphthalenedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-ter-phenyl-4,4"-dicarboxylic acid, (diphenyl ether)-4,4'-dicarboxylic acid, imidazole-4,5-di-carboxylic acid, 4(1H)-oxothiochromene-2,8-dicarboxylic acid, 5-tert-butyl-1,3-benzene-dicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetra-decanedicarboxylic acid, 1,7-heptadicarboxylic acid, 5-hydroxy-1,3-benzene-dicarboxylic acid, 2,5-dihydroxy-1,4-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetra-decanedicarboxylic acid, 5,-6-dehydronorbornane-2,3-dicarboxylic acid, 5-ethyl-2,3-pyridinedicarboxylic acid or camphordicarboxylic acid.

Furthermore, the at least bidentate organic compound is more preferably one of the dicarboxylic acids mentioned by way of example above as such.

For example, the at least bidentate organic compound can be derived from a tricarboxylic acid such as 2-hydroxy-1,2,3-propanetricarboxylic acid, 7-chloro-2,3,8-quinolinetricarboxylic acid, 1,2,3-, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid.

Furthermore, the at least bidentate organic compound is more preferably one of the tricarboxylic acids mentioned by way of example above as such.

Examples of an at least bidentate organic compound derived from a tetracarboxylic acid are 1,1-dioxidoperylo[1,12-BCD]thiophene-3,4,9,10-tetracarboxylic acid, perylenetetracarboxylic acids such as perylene-3,4,9,10-tetracarboxylic acid or (perylene 1,12-sulfone)-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

Furthermore, the at least bidentate organic compound is more preferably one of the tetracarboxylic acids mentioned by way of example above as such.

Preferred heterocycles as at least bidentate organic compounds which form a coordinate bond via the ring heteroatoms are the following substituted or unsubstituted ring systems:

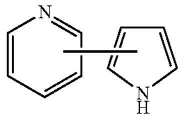

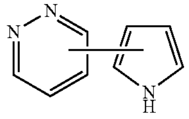

-continued

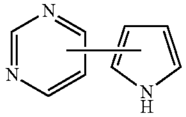
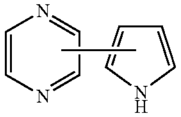
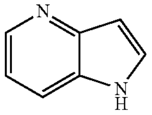
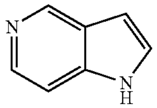
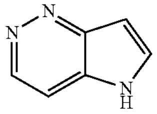
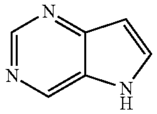
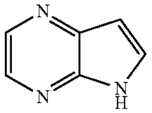
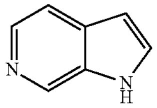
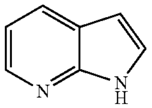
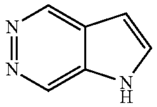
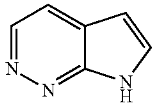
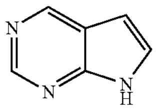
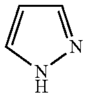
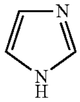
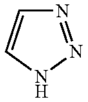
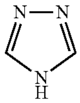

-continued

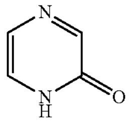
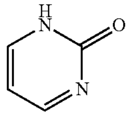
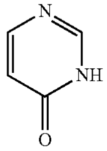
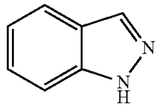
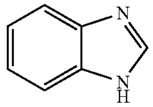
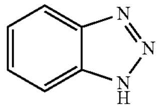
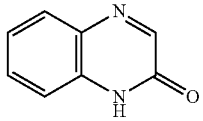
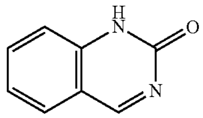
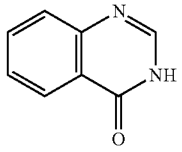

Very particular preference is given to optionally at least monosubstituted aromatic dicarboxylic, tricarboxylic or tetracarboxylic acids having one, two, three, four or more rings, with each of the rings being able to comprise at least one heteroatom and two or more rings being able to comprise identical or different heteroatoms. For example, preference is given to one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P, and preferred heteroatoms are N, S and/or O, Suitable substituents here are, inter alia, —OH, a nitro group, an amino group and an alkyl or alkoxy group.

Particularly preferred at least bidentate organic compounds are imidazolates such as 2-methylimidazolate, are acetylenedicarboxylic acid (ADC), camphordicarboxylic acid, fumaric acid, succinic acid, benzenedicarboxylic acids, such as phthalic acid, isophthalic acid, terephthalic acid (BDC), aminoterephthalic acid, triethylenediamine (TEDA), naphthalenedicarboxylic acids (NDC), biphenyldicarboxylic acids such as 4,4'-biphenyldicarboxylic acid (BPDC), pyrazinedicarboxylic acids such as 2,5-pyrazinedicarboxylic acid, bipyridinedicarboxylic acids such as 2,2'-bipyridinedicarboxylic acids such as 2,2'-bipyridine-5,5'-dicarboxylic acid, benzenetricarboxylic acids such as 1,2,3-, 1,2,4-benzenetricarboxylic acid or 1,3,5-benzenetricarboxylic acid (BTC), benzenetetracarboxylic acid, adamantanetetracarboxylic acid (ATC), adamantanedibenzoate (ADB), benzenetribenzoate (BTB), methanetetrabenzoate (MTB), adamanantetrabenzoate or dihydroxyterephthalic acids such as 2,5-dihydroxy-terephthalic acid (DHBDC), tetrahydropyrene-2,7-dicarboxylic acid (HPDC), biphenyltetracarboxylic acid (BPTC), 1,3-bis(4-pyridyl)propane (BPP).

Very particular preference is given to using, inter alia, 2-methylimidazole, 2-ethylimidazole, phthalic acid, isophthalic acid, terephthalic acid, 2,6-naphthalenedicarboxylic acid, 1,4-naphthalenedicarboxylic acid, 1,5-naphthalenedicarboxylic acid, 1,2,3-benzenetricarboxylic acid, 1,2,4-benzenetricarboxylic acid, 1,3,5-benzenetricarboxylic acid, 1,2,4,5-benzenetetracarboxylic acid, aminoBDC, TEDA, fumaric acid, biphenyldicarboxylate, 1,5- and 2,6-naphthalenedicarboxylic acid, tert-butylisophthalic acid, dihydroxybenzoic acid, BTB, HPDC, BPTC, BPP.

Apart from these at least bidentate organic compounds, the metal-organic framework can also comprise one or more monodentate ligands and/or one or more at least bidentate ligands which are not derived from a dicarboxylic, tricarboxylic or tetracarboxylic acid.

Apart from these at least bidentate organic compounds, the metal-organic framework can also comprise one or more monodentate ligands.

Owing to the use in biodegradable foils or films, preferred at least bidentate organic compounds are formic acid, acetic acid or an aliphatic dicarboxylic or polycarboxylic acid, for example malonic acid, fumaric acid or the like or compounds derived from these.

For the purposes of the present invention, the term "derived" means that the at least one at least bidentate organic compound is present in partially or completely deprotonated form. Furthermore, the term "derived" means that the at least one at least bidentate organic compound can have further substituents. Thus, a dicarboxylic or polycarboxylic acid can have, in addition to the carboxylic acid function, one or more independent substituents such as amino, hydroxyl, methoxy, halogen or methyl groups. Preference is given to no further substituent being present. For the purposes of the present invention, the term "derived" also means that the carboxylic acid function can be present as a sulfur analogue. Sulfur analogues are —C(═O)SH and also its tautomer and —C(S)SH.

Suitable solvents for preparing the metal-organic framework are, inter alia, ethanol, dimethylformamide, toluene, methanol, chlorobenzene, diethylformamide, dimethyl sulfoxide, water, hydrogen peroxide, methylamine, sodium hydroxide solution, N-methylpyrrolidone ether, acetonitrile, benzyl chloride, triethylamine, ethylene glycol and mixtures thereof. Further metal ions, at least bidentate organic compounds and solvents for the preparation of MOFs are described, inter alia, in U.S. Pat. No. 5,648,508 or DE-A 101 11 230.

The pore size of the metal-organic framework can be controlled by selection of the appropriate ligand and/or the at least bidentate organic compound. In general, the larger the organic compound, the larger the pore size. The pore size is preferably from 0.2 nm to 30 nm, particularly preferably in the range from 0.3 nm to 3 nm, based on the crystalline material.

However, larger pores whose size distribution can vary also occur in a shaped body comprising a metal-organic framework. Preference is, however, given to more than 50% of the total pore volume, in particular more than 75%, being made up by pores having a pore diameter of up to 1000 mm. However, preference is given to a major part of the pore volume being made up by pores having two diameter ranges. It is therefore preferred for more than 25% of the total pore volume, in particular more than 50% of the total pore volume, to be made up by pores which have a diameter in the range from 100 nm to 800 nm and more than 15% of the total pore volume, in particular more than 25% of the total pore volume, to be made up by pores which have a diameter up to 10 nm. The pore distribution can be determined by means of mercury porosimetry.

The particle size in the foil or the film can be adapted according to known methods.

Examples of metal-organic frameworks are given below. The designation of the framework, the metal and the at least bidentate ligand and also the solvent and the cell parameters (angles α, β and γ and the dimensions A, B and C in A) are indicated. The latter were determined by X-ray diffraction.

| MOF-n | Constituents molar ratio M + L | Solvents | α | β | γ | a | b | c | Space group |
|---|---|---|---|---|---|---|---|---|---|
| MOF-0 | $Zn(NO_3)_2$•$6H_2O$ $H_3$(BTC) | ethanol | 90 | 90 | 120 | 16.711 | 16.711 | 14.189 | P6(3)/ Mcm |
| MOF-2 | $Zn(NO_3)_2$•$6H_2O$ (0.246 mmol) $H_2$(BDC) 0.241 mmol) | DMF toluene | 90 | 102.8 | 90 | 6.718 | 15.49 | 12.43 | P2(1)/n |
| MOF-3 | $Zn(NO_3)_2$•$6H_2O$ (1.89 mmol) $H_2$(BDC) (1.93 mmol) | DMF MeOH | 99.72 | 111.11 | 108.4 | 9.726 | 9.911 | 10.45 | P-1 |
| MOF-4 | $Zn(NO_3)_2$•$6H_2O$ (1.00 mmol) $H_3$(BTC) (0.5 mmol) | ethanol | 90 | 90 | 90 | 14.728 | 14.728 | 14.728 | P2(1)3 |
| MOF-5 | $Zn(NO_3)_2$•$6H_2O$ (2.22 mmol) $H_2$(BDC) (2.17 mmol) | DMF chloro-benzene | 90 | 90 | 90 | 25.669 | 25.669 | 25.669 | Fm-3m |

-continued

| MOF-n | Constituents molar ratio M + L | Solvents | α | β | γ | a | b | c | Space group |
|---|---|---|---|---|---|---|---|---|---|
| MOF-38 | $Zn(NO_3)_2$•$6H_2O$ (0.27 mmol) $H_3$(BTC) (0.15 mmol) | DMF chloro-benzene | 90 | 90 | 90 | 20.657 | 20.657 | 17.84 | I4cm |
| MOF-31 $Zn(ADC)_2$ | $Zn(NO_3)_2$•$6H_2O$ 0.4 mmol $H_2$(ADC) 0.8 mmol | ethanol | 90 | 90 | 90 | 10.821 | 10.821 | 10.821 | Pn(−3)m |
| MOF-12 $Zn_2$(ATC) | $Zn(NO_3)_2$•$6H_2O$ 0.3 mmol $H_4$(ATC) 0.15 mmol | ethanol | 90 | 90 | 90 | 15.745 | 16.907 | 18.167 | Pbca |
| MOF-20 ZnNDC | $Zn(NO_3)_2$•$6H_2O$ 0.37 mmol $H_2$NDC 0.36 mmol | DMF chloro-benzene | 90 | 92.13 | 90 | 8.13 | 16.444 | 12.807 | P2(1)/c |
| MOF-37 | $Zn(NO_3)_2$•$6H_2O$ 0.2 mmol $H_2$NDC 0.2 mmol | DEF chloro benzene | 72.38 | 83.16 | 84.33 | 9.952 | 11.576 | 15.556 | P-1 |
| MOF-8 $Tb_2$(ADC) | $Tb(NO_3)_3$•$5H_2O$ 0.10 mmol $H_2$ADC 0.20 mmol | DMSO MeOH | 90 | 115.7 | 90 | 19.83 | 9.822 | 19.183 | C2/c |
| MOF-9 $Tb_2$(ADC) | $Tb(NO_3)_3$•$5H_2O$ 0.08 mmol $H_2$ADB 0.12 mmol | DMSO | 90 | 102.09 | 90 | 27.056 | 16.795 | 28.139 | C2/c |
| MOF-6 | $Tb(NO_3)_3$•$5H_2O$ 0.30 mmol $H_2$(BDC) 0.30 mmol | DMF MeOH | 90 | 91.28 | 90 | 17.599 | 19.996 | 10.545 | P21/c |
| MOF-7 | $Tb(NO_3)_3$•$5H_2O$ 0.15 mmol $H_2$(BDC) 0.15 mmol | $H_2O$ | 102.3 | 91.12 | 101.5 | 6.142 | 10.069 | 10.096 | P-1 |
| MOF-69A | $Zn(NO_3)_2$•$6H_2O$ 0.083 mmol 4,4'BPDC 0.041 mmol | DEF $H_2O_2$ $MeNH_2$ | 90 | 111.6 | 90 | 23.12 | 20.92 | 12 | C2/c |
| MOF-69B | $Zn(NO_3)_2$•$6H_2O$ 0.083 mmol 2,6-NCD 0.041 mmol | DEF $H_2O_2$ $MeNH_2$ | 90 | 95.3 | 90 | 20.17 | 18.55 | 12.16 | C2/c |
| MOF-11 $Cu_2$(ATC) | $Cu(NO_3)_2$•$2.5H_2O$ 0.47 mmol $H_2$ATC 0.22 mmol | $H_2O$ | 90 | 93.86 | 90 | 12.987 | 11.22 | 11.336 | C2/c |
| MOF-11 $Cu_2$(ATC) dehydr. | | | 90 | 90 | 90 | 8.4671 | 8.4671 | 14.44 | P42/ mmc |
| MOF-14 $Cu_3$(BTB) | $Cu(NO_3)_2$•$2.5H_2O$ 0.28 mmol $H_3$BTB 0.052 mmol | $H_2O$ DMF EtOH | 90 | 90 | 90 | 26.946 | 26.946 | 26.946 | Im-3 |
| MOF-32 Cd(ATC) | $Cd(NO_3)_2$•$4H_2O$ 0.24 mmol $H_4$ATC 0.10 mmol | $H_2O$ NaOH | 90 | 90 | 90 | 13.468 | 13.468 | 13.468 | P(−4)3m |
| MOF-33 $Zn_2$(ATB) | $ZnCl_2$ 0.15 mmol $H_4$ATB 0.02 mmol | $H_2O$ DMF EtOH | 90 | 90 | 90 | 19.561 | 15.255 | 23.404 | Imma |
| MOF-34 Ni(ATC) | $Ni(NO_3)_2$•$6H_2O$ 0.24 mmol $H_4$ATC 0.10 mmol | $H_2O$ NaOH | 90 | 90 | 90 | 10.066 | 11.163 | 19.201 | $P2_12_12_1$ |
| MOF-36 $Zn_2$(MTB) | $Zn(NO_3)_2$•$4H_2O$ 0.20 mmol $H_4$MTB 0.04 mmol | $H_2O$ DMF | 90 | 90 | 90 | 15.745 | 16.907 | 18.167 | Pbca |
| MOF-39 $Zn_3O$(HBTB) | $Zn(NO_3)_24H_2O$ 0.27 mmol $H_3$BTB 0.07 mmol | $H_2O$ DMF EtOH | 90 | 90 | 90 | 17.158 | 21.591 | 25.308 | Pnma |

-continued

| MOF-n | Constituents molar ratio M + L | Solvents | α | β | γ | a | b | c | Space group |
|---|---|---|---|---|---|---|---|---|---|
| NO305 | $FeCl_2$•$4H_2O$ 5.03 mmol formic acid 86.90 mmol | DMF | 90 | 90 | 120 | 8.2692 | 8.2692 | 63.566 | R-3c |
| NO306A | $FeCl_2$•$4H_2O$ 5.03 mmol formic acid 86.90 mmol | DEF | 90 | 90 | 90 | 9.9364 | 18.374 | 18.374 | Pbcn |
| NO29 MOF-0 similar | $Mn(Ac)_2$•$4H_2O$ 0.46 mmol $H_3BTC$ 0.69 mmol | DMF | 120 | 90 | 90 | 14.16 | 33.521 | 33.521 | P-1 |
| BPR48 A2 | $Zn(NO_3)_26H_2O$ 0.012 mmol $H_2BDC$ 0.012 mmol | DMSO toluene | 90 | 90 | 90 | 14.5 | 17.04 | 18.02 | Pbca |
| BPR69 B1 | $Cd(NO_3)_24H_2O$ 0.0212 mmol $H_2BDC$ 0.0428 mmol | DMSO | 90 | 98.76 | 90 | 14.16 | 15.72 | 17.66 | Cc |
| BPR92 A2 | $Co(NO_3)_2$•$6H_2O$ 0.018 mmol $H_2BDC$ 0.018 mmol | NMP | 106.3 | 107.63 | 107.2 | 7.5308 | 10.942 | 11.025 | P1 |
| BPR95 C5 | $Cd(NO_3)_24H_2O$ 0.012 mmol $H_2BDC$ 0.36 mmol | NMP | 90 | 112.8 | 90 | 14.460 | 11.085 | 15.829 | P2(1)/n |
| $CuC_6H_4O_6$ | $Cu(NO_3)_2$•$2.5H_2O$ 0.370 mmol $H_2BDC(OH)_2$ 0.37 mmol | DMF chlorobenzene | 90 | 105.29 | 90 | 15.259 | 14.816 | 14.13 | P2(1)/c |
| M(BTC) MOF-0 similar | $Co(SO_4)$ $H_2O$ 0.055 mmol $H_3BTC$ 0.037 mmol | DMF | | as for MOF-0 | | | | | |
| $Tb(C_6H_4O_6)$ | $Tb(NO_3)_3$•$5H_2O$ 0.370 mmol $H_2(C_6H_4O_6)$ 0.56 mmol | DMF chlorobenzene | 104.6 | 107.9 | 97.147 | 10.491 | 10.981 | 12.541 | P-1 |
| $Zn(C_2O_4)$ | $ZnCl_2$ 0.370 mmol oxalic acid 0.37 mmol | DMF chlorobenzene | 90 | 120 | 90 | 9.4168 | 9.4168 | 8.464 | P(−3)1m |
| Co(CHO) | $Co(NO_3)_2$•$5H_2O$ 0.043 mmol formic acid 1.60 mmol | DMF | 90 | 91.32 | 90 | 11.328 | 10.049 | 14.854 | P2(1)/n |
| Cd(CHO) | $Cd(NO_3)_2$•$4H_2O$ 0.185 mmol formic acid 0.185 mmol | DMF | 90 | 120 | 90 | 8.5168 | 8.5168 | 22.674 | R-3c |
| $Cu(C_3H_2O_4)$ | $Cu(NO_3)_2$•$2.5H_2O$ 0.043 mmol malonic acid 0.192 mmol | DMF | 90 | 90 | 90 | 8.366 | 8.366 | 11.919 | P43 |
| $Zn_6(NDC)_5$ MOF-48 | $Zn(NO_3)_2$•$6H_2O$ 0.097 mmol 14 NDC 0.069 mmol | DMF chlorobenzene $H_2O_2$ | 90 | 95.902 | 90 | 19.504 | 16.482 | 14.64 | C2/m |
| MOF-47 | $Zn(NO_3)_26H_2O$ 0.185 mmol $H_2(BDC[CH_3]_4)$ 0.185 mmol | DMF chlorobenzene $H_2O_2$ | 90 | 92.55 | 90 | 11.303 | 16.029 | 17.535 | P2(1)/c |
| MO25 | $Cu(NO_3)_2$•$2.5H_2O$ 0.084 mmol BPhDC 0.085 mmol | DMF | 90 | 112.0 | 90 | 23.880 | 16.834 | 18.389 | P2(1)/c |
| Cu-Thio | $Cu(NO_3)_2$•$2.5H_2O$ 0.084 mmol thiophenedicarboxylic acid 0.085 mmol | DEF | 90 | 113.6 | 90 | 15.4747 | 14.514 | 14.032 | P2(1)/c |
| ClBDC1 | $Cu(NO_3)_2$•$2.5H_2O$ 0.084 mmol $H_2(BDCCl_2)$ 0.085 mmol | DMF | 90 | 105.6 | 90 | 14.911 | 15.622 | 18.413 | C2/c |

-continued

| MOF-n | Constituents<br>molar ratio<br>M + L | Solvents | α | β | γ | a | b | c | Space<br>group |
|---|---|---|---|---|---|---|---|---|---|
| MOF-101 | $Cu(NO_3)_2$•$2.5H_2O$<br>0.084 mmol<br>BrBDC<br>0.085 mmol | DMF | 90 | 90 | 90 | 21.607 | 20.607 | 20.073 | Fm3m |
| $Zn_3(BTC)_2$ | $ZnCl_2$<br>0.033 mmol<br>$H_3BTC$<br>0.033 mmol | DMF<br>EtOH<br>base<br>added | 90 | 90 | 90 | 26.572 | 26.572 | 26.572 | Fm-3m |
| MOF-j | $Co(CH_3CO_2)_2$•$4H_2O$<br>(1.65 mmol)<br>$H_3(BZC)$<br>(0.95 mmol) | $H_2O$ | 90 | 112.0 | 90 | 17.482 | 12.963 | 6.559 | C2 |
| MOF-n | $Zn(NO_3)_2$•$6H_2O$<br>$H_3(BTC)$ | ethanol | 90 | 90 | 120 | 16.711 | 16.711 | 14.189 | P6(3)/mcm |
| PbBDC | $Pb(NO_3)_2$<br>(0.181 mmol)<br>$H_2(BDC)$<br>(0.181 mmol) | DMF<br>ethanol | 90 | 102.7 | 90 | 8.3639 | 17.991 | 9.9617 | P2(1)/n |
| Znhex | $Zn(NO_3)_2$•$6H_2O$<br>(0.171 mmol)<br>$H_3BTB$<br>(0.114 mmol) | DMF<br>p-xylene<br>ethanol | 90 | 90 | 120 | 37.1165 | 37.117 | 30.019 | P3(1)c |
| AS16 | $FeBr_2$<br>0.927 mmol<br>$H_2(BDC)$<br>0.927 mmol | DMF<br>anhydr. | 90 | 90.13 | 90 | 7.2595 | 8.7894 | 19.484 | P2(1)c |
| AS27-2 | $FeBr_2$<br>0.927 mmol<br>$H_3(BDC)$<br>0.464 mmol | DMF<br>anhydr. | 90 | 90 | 90 | 26.735 | 26.735 | 26.735 | Fm3m |
| AS32 | $FeCl_3$<br>1.23 mmol<br>$H_2(BDC)$<br>1.23 mmol | DMF<br>anhydr.<br>ethanol | 90 | 90 | 120 | 12.535 | 12.535 | 18.479 | P6(2)c |
| AS54-3 | $FeBr_2$<br>0.927<br>BPDC<br>0.927 mmol | DMF<br>anhydr.<br>n-<br>propanol | 90 | 109.98 | 90 | 12.019 | 15.286 | 14.399 | C2 |
| AS61-4 | $FeBr_2$<br>0.927 mmol<br>m-BDC<br>0.927 mmol | pyridine<br>anhydr. | 90 | 90 | 120 | 13.017 | 13.017 | 14.896 | P6(2)c |
| AS68-7 | $FeBr_2$<br>0.927 mmol<br>m-BDC<br>1.204 mmol | DMF<br>anhydr.<br>pyridine | 90 | 90 | 90 | 18.3407 | 10.036 | 18.039 | $Pca2_1$ |
| Zn(ADC) | $Zn(NO_3)_2$•$6H_2O$<br>0.37 mmol<br>$H_2(ADC)$<br>0.36 mmol | DMF<br>chlorobenzene | 90 | 99.85 | 90 | 16.764 | 9.349 | 9.635 | C2/c |
| MOF-12<br>$Zn_2(ATC)$ | $Zn(NO_3)_2$•$6H_2O$<br>0.30 mmol<br>$H_4(ATC)$<br>0.15 mmol | ethanol | 90 | 90 | 90 | 15.745 | 16.907 | 18.167 | Pbca |
| MOF-20<br>ZnNDC | $Zn(NO_3)_2$•$6H_2O$<br>0.37 mmol<br>$H_2NDC$<br>0.36 mmol | DMF<br>chlorobenzene | 90 | 92.13 | 90 | 8.13 | 16.444 | 12.807 | P2(1)/c |
| MOF-37 | $Zn(NO_3)_2$•$6H_2O$<br>0.20 mmol<br>$H_2NDC$<br>0.20 mmol | DEF<br>chlorobenzene | 72.38 | 83.16 | 84.33 | 9.952 | 11.576 | 15.556 | P-1 |
| Zn(NDC)<br>(DMSO) | $Zn(NO_3)_2$•$6H_2O$<br>$H_2NDC$ | DMSO | 68.08 | 75.33 | 88.31 | 8.631 | 10.207 | 13.114 | P-1 |
| Zn(NDC) | $Zn(NO_3)_2$•$6H_2O$<br>$H_2NDC$ | | 90 | 99.2 | 90 | 19.289 | 17.628 | 15.052 | C2/c |
| Zn(HPDC) | $Zn(NO_3)_2$•$4H_2O$<br>0.23 mmol<br>$H_2(HPDC)$<br>0.05 mmol | DMF<br>$H_2O$ | 107.9 | 105.06 | 94.4 | 8.326 | 12.085 | 13.767 | P-1 |
| Co(HPDC) | $Co(NO_3)_2$•$6H_2O$<br>0.21 mmol<br>$H_2(HPDC)$<br>0.06 mmol | DMF<br>$H_2O$/<br>ethanol | 90 | 97.69 | 90 | 29.677 | 9.63 | 7.981 | C2/c |
| $Zn_3(PDC)2.5$ | $Zn(NO_3)_2$•$4H_2O$<br>0.17 mmol | DMF/<br>ClBz | 79.34 | 80.8 | 85.83 | 8.564 | 14.046 | 26.428 | P-1 |

-continued

| MOF-n | Constituents<br>molar ratio<br>M + L | Solvents | α | β | γ | a | b | c | Space<br>group |
|---|---|---|---|---|---|---|---|---|---|
| | $H_2$(HPDC)<br>0.05 mmol | $H_2$0/<br>TEA | | | | | | | |
| $Cd_2$(TPDC)2 | $Cd(NO_3)_2$•$4H_2O$<br>0.06 mmol<br>$H_2$(HPDC)<br>0.06 mmol | methanol/<br>CHP<br>$H_2O$ | 70.59 | 72.75 | 87.14 | 10.102 | 14.412 | 14.964 | P-1 |
| Tb(PDC)1.5 | $Tb(NO_3)_3$•$5H_2O$<br>0.21 mmol<br>$H_2$(PDC)<br>0.034 mmol | DMF<br>$H_2O$/<br>ethanol | 109.8 | 103.61 | 100.14 | 9.829 | 12.11 | 14.628 | P-1 |
| ZnDBP | $Zn(NO_3)_2$•$6H_2O$<br>0.05 mmol<br>dibenzyl phosphate<br>0.10 mmol | MeOH | 90 | 93.67 | 90 | 9.254 | 10.762 | 27.93 | P2/n |
| $Zn_3$(BPDC) | $ZnBr_2$<br>0.021 mmol<br>4,4'BPDC<br>0.005 mmol | DMF | 90 | 102.76 | 90 | 11.49 | 14.79 | 19.18 | P21/n |
| CdBDC | $Cd(NO_3)_2$•$4H_2O$<br>0.100 mmol<br>$H_2$(BDC)<br>0.401 mmol | DMF<br>$Na_2SiO_3$<br>(aq) | 90 | 95.85 | 90 | 11.2 | 11.11 | 16.71 | P21/n |
| Cd-mBDC | $Cd(NO_3)_2$•$4H_2O$<br>0.009 mmol<br>$H_2$(mBDC)<br>0.018 mmol | DMF<br>$MeNH_2$ | 90 | 101.1 | 90 | 13.69 | 18.25 | 14.91 | C2/c |
| $Zn_4$OBNDC | $Zn(NO_3)_2$•$6H_2O$<br>0.041 mmol<br>BNDC | DEF<br>$MeNH_2$<br>$H_2O_2$ | 90 | 90 | 90 | 22.35 | 26.05 | 59.56 | Fmmm |
| Eu(TCA) | $Eu(NO_3)_3$•$6H_2O$<br>0.14 mmol<br>TCA<br>0.026 mmol | DMF<br>chlorobenzene | 90 | 90 | 90 | 23.325 | 23.325 | 23.325 | Pm-3n |
| Tb(TCA) | $Tb(NO_3)_3$•$6H_2O$<br>0.069 mmol<br>TCA<br>0.026 mmol | DMF<br>chlorobenzene | 90 | 90 | 90 | 23.272 | 23.272 | 23.372 | Pm-3n |
| Formates | $Ce(NO_3)_3$•$6H_2O$<br>0.138 mmol<br>formic acid<br>0.43 mmol | $H_2O$<br>ethanol | 90 | 90 | 120 | 10.668 | 10.667 | 4.107 | R-3m |
| | $FeCl_2$•$4H_2O$<br>5.03 mmol<br>formic acid<br>86.90 mmol | DMF | 90 | 90 | 120 | 8.2692 | 8.2692 | 63.566 | R-3c |
| | $FeCl_2$•$4H_2O$<br>5.03 mmol<br>formic acid<br>86.90 mmol | DEF | 90 | 90 | 90 | 9.9364 | 18.374 | 18.374 | Pbcn |
| | $FeCl_2$•$4H_2O$<br>5.03 mmol<br>formic acid<br>86.90 mmol | DEF | 90 | 90 | 90 | 8.335 | 8.335 | 13.34 | P-31c |
| NO330 | $FeCl_2$•$4H_2O$<br>0.50 mmol<br>formic acid<br>8.69 mmol | form-<br>amide | 90 | 90 | 90 | 8.7749 | 11.655 | 8.3297 | Pnna |
| NO332 | $FeCl_2$•$4H_2O$<br>0.50 mmol<br>formic acid<br>8.69 mmol | DIP | 90 | 90 | 90 | 10.0313 | 18.808 | 18.355 | Pbcn |
| NO333 | $FeCl_2$•$4H_2O$<br>0.50 mmol<br>formic acid<br>8.69 mmol | DBF | 90 | 90 | 90 | 45.2754 | 23.861 | 12.441 | Cmcm |
| NO335 | $FeCl_2$•$4H_2O$<br>0.50 mmol<br>formic acid<br>8.69 mmol | CHF | 90 | 91.372 | 90 | 11.5964 | 10.187 | 14.945 | P21/n |
| NO336 | $FeCl_2$•$4H_2O$<br>0.50 mmol<br>formic acid<br>8.69 mmol | MFA | 90 | 90 | 90 | 11.7945 | 48.843 | 8.4136 | Pbcm |
| NO13 | $Mn(Ac)_2$•$4H_2O$<br>0.46 mmol<br>benzoic acid | ethanol | 90 | 90 | 90 | 18.66 | 11.762 | 9.418 | Pbcn |

-continued

| MOF-n | Constituents molar ratio M + L | Solvents | α | β | γ | a | b | c | Space group |
|---|---|---|---|---|---|---|---|---|---|
| | 0.92 mmol<br>bipyridine<br>0.46 mmol | | | | | | | | |
| NO29<br>MOF-0<br>similar | $Mn(Ac)_2$•$4H_2O$<br>0.46 mmol<br>$H_3BTC$<br>0.69 mmol | DMF | 120 | 90 | 90 | 14.16 | 33.521 | 33.521 | P-1 |
| $Mn(hfac)_2$<br>$(O_2CC_6H_5)$ | $Mn(Ac)_2$•$4H_2O$<br>0.46 mmol<br>Hfac<br>0.92 mmol<br>bipyridine<br>0.46 mmol | ether | 90 | 95.32 | 90 | 9.572 | 17.162 | 14.041 | C2/c |
| BPR43G2 | $Zn(NO_3)_2$•$6H_2O$<br>0.0288 mmol<br>$H_2BDC$<br>0.0072 mmol | DMF<br>$CH_3CN$ | 90 | 91.37 | 90 | 17.96 | 6.38 | 7.19 | C2/c |
| BPR48A2 | $Zn(NO_3)_26H_2O$<br>0.012 mmol<br>$H_2BDC$<br>0.012 mmol | DMSO<br>toluene | 90 | 90 | 90 | 14.5 | 17.04 | 18.02 | Pbca |
| BPR49B1 | $Zn(NO_3)_26H_2O$<br>0.024 mmol<br>$H_2BDC$<br>0.048 mmol | DMSO<br>methanol | 90 | 91.172 | 90 | 33.181 | 9.824 | 17.884 | C2/c |
| BPR56E1 | $Zn(NO_3)_26H_2O$<br>0.012 mmol<br>$H_2BDC$<br>0.024 mmol | DMSO<br>n-<br>propanol | 90 | 90.096 | 90 | 14.5873 | 14.153 | 17.183 | P2(1)/n |
| BPR68D10 | $Zn(NO_3)_26H_2O$<br>0.0016 mmol<br>$H_3BTC$<br>0.0064 mmol | DMSO<br>benzene | 90 | 95.316 | 90 | 10.0627 | 10.17 | 16.413 | P2(1)/c |
| BPR69B1 | $Cd(NO_3)_24H_2O$<br>0.0212 mmol<br>$H_2BDC$<br>0.0428 mmol | DMSO | 90 | 98.76 | 90 | 14.16 | 15.72 | 17.66 | Cc |
| BPR73E4 | $Cd(NO_3)_24H_2O$<br>0.006 mmol<br>$H_2BDC$<br>0.003 mmol | DMSO<br>toluene | 90 | 92.324 | 90 | 8.7231 | 7.0568 | 18.438 | P2(1)/n |
| BPR76D5 | $Zn(NO_3)_26H_2O$<br>0.0009 mmol<br>$H_2BzPDC$<br>0.0036 mmol | DMSO | 90 | 104.17 | 90 | 14.4191 | 6.2599 | 7.0611 | Pc |
| BPR80B5 | $Cd(NO_3)_2$•$4H_2O$<br>0.018 mmol<br>$H_2BDC$<br>0.036 mmol | DMF | 90 | 115.11 | 90 | 28.049 | 9.184 | 17.837 | C2/c |
| BPR80H5 | $Cd(NO_3)_24H_2O$<br>0.027 mmol<br>$H_2BDC$<br>0.027 mmol | DMF | 90 | 119.06 | 90 | 11.4746 | 6.2151 | 17.268 | P2/c |
| BPR82C6 | $Cd(NO_3)_24H_2O$<br>0.0068 mmol<br>$H_2BDC$<br>0.202 mmol | DMF | 90 | 90 | 90 | 9.7721 | 21.142 | 27.77 | Fdd2 |
| BPR86C3 | $Co(NO_3)_26H_2O$<br>0.0025 mmol<br>$H_2BDC$<br>0.075 mmol | DMF | 90 | 90 | 90 | 18.3449 | 10.031 | 17.983 | Pca2(1) |
| BPR86H6 | $Cd(NO_3)_2$•$6H_2O$<br>0.010 mmol<br>$H_2BDC$<br>0.010 mmol | DMF | 80.98 | 89.69 | 83.412 | 9.8752 | 10.263 | 15.362 | P-1 |
| | $Co(NO_3)_26H_2O$ | NMP | 106.3 | 107.63 | 107.2 | 7.5308 | 10.942 | 11.025 | P1 |
| BPR95A2 | $Zn(NO_3)_26H_2O$<br>0.012 mmol<br>$H_2BDC$<br>0.012 mmol | NMP | 90 | 102.9 | 90 | 7.4502 | 13.767 | 12.713 | P2(1)/c |
| $CuC_6F_4O_4$ | $Cu(NO_3)_2$•$2.5H_2O$<br>0.370 mmol<br>$H_2BDC(OH)_2$<br>0.37 mmol | DMF<br>chloro<br>benzene | 90 | 98.834 | 90 | 10.9675 | 24.43 | 22.553 | P2(1)/n |
| Fe formic | $FeCl_2$•$4H_2O$<br>0.370 mmol | DMF | 90 | 91.543 | 90 | 11.495 | 9.963 | 14.48 | P2(1)/n |

-continued

| MOF-n | Constituents molar ratio M + L | Solvents | α | β | γ | a | b | c | Space group |
|---|---|---|---|---|---|---|---|---|---|
| | formic acid 0.37 mmol | | | | | | | | |
| Mg formic | $Mg(NO_3)_2$•$6H_2O$ 0.370 mmol formic acid 0.37 mmol | DMF | 90 | 91.359 | 90 | 11.383 | 9.932 | 14.656 | P2(1)/n |
| $MgC_6H_4O_6$ | $Mg(NO_3)_2$•$6H_2O$ 0.370 mmol $H_2BDC(OH)_2$ 0.37 mmol | DMF | 90 | 96.624 | 90 | 17.245 | 9.943 | 9.273 | C2/c |
| $ZnC_2H_4BDC$ MOF-38 | $ZnCl_2$ 0.44 mmol CBBDC 0.261 mmol | DMF | 90 | 94.714 | 90 | 7.3386 | 16.834 | 12.52 | P2(1)/n |
| MOF-49 | $ZnCl_2$ 0.44 mmol m-BDC 0.261 mmol | DMF $CH_3CN$ | 90 | 93.459 | 90 | 13.509 | 11.984 | 27.039 | P2/c |
| MOF-26 | $Cu(NO_3)_2$•$5H_2O$ 0.084 mmol DCPE 0.085 mmol | DMF | 90 | 95.607 | 90 | 20.8797 | 16.017 | 26.176 | P2(1)/n |
| MOF-112 | $Cu(NO_3)_2$•$2.5H_2O$ 0.084 mmol o-Br-m-BDC 0.085 mmol | DMF ethanol | 90 | 107.49 | 90 | 29.3241 | 21.297 | 18.069 | C2/c |
| MOF-109 | $Cu(NO_3)_2$•$2.5H_2O$ 0.084 mmol KDB 0.085 mmol | DMF | 90 | 111.98 | 90 | 23.8801 | 16.834 | 18.389 | P2(1)/c |
| MOF-111 | $Cu(NO_3)_2$•$2.5H_2O$ 0.084 mmol o-BrBDC 0.085 mmol | DMF ethanol | 90 | 102.16 | 90 | 10.6767 | 18.781 | 21.052 | C2/c |
| MOF-110 | $Cu(NO_3)_2$•$2.5H_2O$ 0.084 mmol thiophenedicarboxylic acid 0.085 mmol | DMF | 90 | 90 | 120 | 20.0652 | 20.065 | 20.747 | R-3/m |
| MOF-107 | $Cu(NO_3)_2$•$2.5H_2O$ 0.084 mmol thiophenedicarboxylic acid 0.085 mmol | DEF | 104.8 | 97.075 | 95.206 | 11.032 | 18.067 | 18.452 | P-1 |
| MOF-108 | Cu(NO3)2•2.5H2O 0.084 mmol thiophenedicarboxylic acid 0.085 mmol | DBF/ methanol | 90 | 113.63 | 90 | 15.4747 | 14.514 | 14.032 | C2/c |
| MOF-102 | Cu(NO3)2•2.5H2O 0.084 mmol H2(BDCCl2) 0.085 mmol | DMF | 91.63 | 106.24 | 112.01 | 9.3845 | 10.794 | 10.831 | P-1 |
| Clbdc1 | Cu(NO3)2•2.5H2O 0.084 mmol H2(BDCCl2) 0.085 mmol | DEF | 90 | 105.56 | 90 | 14.911 | 15.622 | 18.413 | P-1 |
| Cu(NMOP) | Cu(NO3)2•2.5H2O 0.084 mmol NBDC 0.085 mmol | DMF | 90 | 102.37 | 90 | 14.9238 | 18.727 | 15.529 | P2(1)/m |
| Tb(BTC) | Tb(NO3)3•5H2O 0.033 mmol H3BTC 0.033 mmol | DMF | 90 | 106.02 | 90 | 18.6986 | 11.368 | 19.721 | |
| Zn3(BTC)2 Honk | ZnCl2 0.033 mmol H3BTC 0.033 mmol | DMF ethanol | 90 | 90 | 90 | 26.572 | 26.572 | 26.572 | Fm-3m |
| Zn4O(NDC) | Zn(NO3)2•4H2O 0.066 mmol 14NDC 0.066 mmol | DMF ethanol | 90 | 90 | 90 | 41.5594 | 18.818 | 17.574 | aba2 |
| CdTDC | Cd(NO3)2•4H2O 0.014 mmol thiophene | DMF H2O | 90 | 90 | 90 | 12.173 | 10.485 | 7.33 | Pmma |

-continued

| MOF-n | Constituents<br>molar ratio<br>M + L | Solvents | α | β | γ | a | b | c | Space<br>group |
|---|---|---|---|---|---|---|---|---|---|
| | 0.040 mmol<br>DABCO<br>0.020 mmol | | | | | | | | |
| IRMOF-2 | Zn(NO3)2•4H2O<br>0.160 mmol<br>o-Br-BDC<br>0.60 mmol | DEF | 90 | 90 | 90 | 25.772 | 25.772 | 25.772 | Fm-3m |
| IRMOF-3 | Zn(NO3)2•4H2O<br>0.20 mmol<br>H2N-BDC<br>0.60 mmol | DEF<br>ethanol | 90 | 90 | 90 | 25.747 | 25.747 | 25.747 | Fm-3m |
| IRMOF-4 | Zn(NO3)2•4H2O<br>0.11 mmol<br>[C3H7O]2-BDC<br>0.48 mmol | DEF | 90 | 90 | 90 | 25.849 | 25.849 | 25.849 | Fm-3m |
| IRMOF-5 | Zn(NO3)2•4H2O<br>0.13 mmol<br>[C5H11O]2-BDC<br>0.50 mmol | DEF | 90 | 90 | 90 | 12.882 | 12.882 | 12.882 | Pm-3m |
| IRMOF-6 | Zn(NO3)2•4H2O<br>0.20 mmol<br>[C2H4]-BDC<br>0.60 mmol | DEF | 90 | 90 | 90 | 25.842 | 25.842 | 25.842 | Fm-3m |
| IRMOF-7 | Zn(NO3)2•4H2O<br>0.07 mmol<br>1,4NDC<br>0.20 mmol | DEF | 90 | 90 | 90 | 12.914 | 12.914 | 12.914 | Pm-3m |
| IRMOF-8 | Zn(NO3)2•4H2O<br>0.55 mmol<br>2,6NDC<br>0.42 mmol | DEF | 90 | 90 | 90 | 30.092 | 30.092 | 30.092 | Fm-3m |
| IRMOF-9 | Zn(NO3)2•4H2O<br>0.05 mmol<br>BPDC<br>0.42 mmol | DEF | 90 | 90 | 90 | 17.147 | 23.322 | 25.255 | Pnnm |
| IRMOF-10 | Zn(NO3)2•4H2O<br>0.02 mmol<br>BPDC<br>0.012 mmol | DEF | 90 | 90 | 90 | 34.281 | 34.281 | 34.281 | Fm-3m |
| IRMOF-11 | Zn(NO3)2•4H2O<br>0.05 mmol<br>HPDC<br>0.20 mmol | DEF | 90 | 90 | 90 | 24.822 | 24.822 | 56.734 | R-3m |
| IRMOF-12 | Zn(NO3)2•4H2O<br>0.017 mmol<br>HPDC<br>0.12 mmol | DEF | 90 | 90 | 90 | 34.281 | 34.281 | 34.281 | Fm-3m |
| IRMOF-13 | $Zn(NO_3)_2 \cdot 4H_2O$<br>0.048 mmol<br>PDC<br>0.31 mmol | DEF | 90 | 90 | 90 | 24.822 | 24.822 | 56.734 | R-3m |
| IRMOF-14 | $Zn(NO_3)_2 \cdot 4H_2O$<br>0.17 mmol<br>PDC<br>0.12 mmol | DEF | 90 | 90 | 90 | 34.381 | 34.381 | 34.381 | Fm-3m |
| IRMOF-15 | $Zn(NO_3)_2 \cdot 4H_2O$<br>0.063 mmol<br>TPDC<br>0.025 mmol | DEF | 90 | 90 | 90 | 21.459 | 21.459 | 21.459 | Im-3m |
| IRMOF-16 | $Zn(NO_3)_2 \cdot 4H_2O$<br>0.0126 mmol<br>TPDC<br>0.05 mmol | DEF<br>NMP | 90 | 90 | 90 | 21.49 | 21.49 | 21.49 | Pm-3m |

ADC Acetylenedicarboxylic acid
NDC Naphthalenedicarboxylic acid
BDC Benzenedicarboxylic acid
ATC Adamantanetetracarboxylic acid
BTC Benzenetricarboxylic acid
BTB Benzenetribenzoic acid
MTB Methanetetrabenzoic acid
ATB Adamantanetetrabenzoic acid
ADB Adamantanedibenzoic acid Further metal-organic frameworks are MOF-2 to 4, MOF-9, MOF-31 to 36, MOF-39, MOF-69 to 80, MOF103 to 106, MOF-122, MOF-125, MOF-150, MOF-177, MOF-178, MOF-235, MOF-236, MOF-500, MOF-501, MOF-502, MOF-505, IRMOF-1, IRMOF-61, IRMOP-13, IRMOP-51, MIL-17, MIL-45, MIL-47, MIL-53, MIL-59, MIL-60, MIL-61, MIL-63, MIL-68, MIL-79, MIL-80, MIL-83, MIL-85, CPL-1 to 2, SZL-1, which are described in the literature.

Particularly preferred metal-organic frameworks are MIL-53, Zn-tBu-isophthalic acid, Al-BDC, MOF-5, MOF-177, MOF-505, IRMOF-8, IRMOF-11, Cu-BTC, Al-NDC, Al-aminoBDC, Cu-BDC-TEDA, Zn-BDC-TEDA, Al-BTC, Cu-BTC, Al-NDC, Mg-NDC, Al-fumarate, Zn-2-methylimidazolate, Zn-2-aminoimidazolate, Cu-biphenyldicarboxylate-TEDA, MOF-74, Cu-BPP, Sc-terephthalate. Greater preference is given to Sc-terephthalate, Cu-BTC, Al-BDC and Al-BTC. However, owing to their environmental compatibility, very particular preference is given to Mg-formate, Mg-acetate and mixtures thereof.

Apart from the conventional method of preparing the MOFs, as described, for example, in U.S. Pat. No. 5,648,508, these can also be prepared by an electrochemical route. In this respect, reference is made to DE-A 103 55 087 and WO-A 2005/049892. The metal-organic frameworks prepared in this way have particularly good properties with regard to the adsorption and desorption of chemical substances, in particular gases.

Regardless of the method of preparation, the metal-organic framework is generally obtained in pulverulent or crystalline form. This can be used as sorbent as such either alone or together with other sorbents or further materials. The metal-organic framework can also be converted into a shaped body.

Preference is also given to the at least one metal-organic framework being present in a proportion of from 0.01% by weight to 10% by weight based on the total weight of the polymer. More preferred is from 0.1 wt.-% to 10 wt.-%, more preferred 1 wt.-% to 10 wt.-%, more preferred 1 wt.-% to 5 wt.-%.

The present invention further provides food packaging comprising a biodegradable material according to the invention. The food packaging is preferably fruit or vegetable packaging.

The present invention further provides for the use of a material according to the invention for the packaging of foods.

The present invention further provides for the use of a porous metal-organic framework for the absorption of ethene in food packaging.

EXAMPLES

Example 1

Preparation of a Magnesium Formate-Based Metal-Organic Framework

| | | |
|---|---|---|
| 1) Magnesium nitrate * 6 water | 38.5 mmol | 9.90 g |
| 2) Formic acid | 106.5 mmol | 4.8 g |
| 3) DMF | 2.19 mol | 160.0 g |

The magnesium nitrate is dissolved in DMF in an autoclave liner. The formic acid is added and the solution is stirred for 10 minutes. (pH-3.49)

Crystallization:

125° C./78 h

Removal from autoclave:

Clear solution with white crystals

Work-Up:

The crystals are filtered off and washed twice with 50 ml of DMF.

Weight obtained: 5.162 g

Example 2

Production of a Biodegradable Foil Comprising a Metal-Organic Framework Using Laboratory Equipment 10 g of Ecoflex® pellets are dissolved in $CHCl_3$ or $CH_2Cl_2$ to obtain a solution comprising 10% by weight of polymer. This solution is stirred overnight at room temperature. 1% by weight (example 2a) or 5% by weight (example 2b) of framework from example 1 are then added. The suspension obtained is stirred for about 30 minutes until homogeneous. The suspension is spread on a glass plate by means of a doctor blade. Evaporation of the solvent gives, after about 1 hour, a film on the glass plate, which can be detached from the plate, if appropriate with the aid of a little water, to give a foil.

Example 3

Adsorption Measurement

An adsorption/desorption measurement is carried out on the framework from example 1 using a Rubotherm magnetic suspension balance (metal version with metering system).

FIG. 1 shows the ethene absorption at 298 K. Here, the absorption A (in mg of ethene/g of framework) is shown as a function of the absolute pressure P (in mbar).

Example 4

Influence of Framework on the Ripening Process of a Fruit

About 600 g of bananas are stored in a dry vessel at room temperature for 12 days together with 1 g of framework from example 1 (4a) and without framework (4b).

The bananas then have the following nature:

| | With MOF (4a) | Without MOF (4b) |
|---|---|---|
| Consistency | Soft | very soft to mushy |
| Odor | Sweetish | rotten |

It can be seen than the ripening process of the bananas is reduced by the presence of the metal-organic framework.

Example 5

Gas Adsorption Properties for Ethylene

The following table shows the uptake capacity for ethylene of various sorption materials at room temperature and 1 bar.

| material | Langmuir surface area ($m^2/g$) | ethylene uptake (wt.-%) |
|---|---|---|
| Active carbon | 1900 | — |
| Zeolite 13X | 700 | 8 |
| Mg-Formte MOF (Exa. 1) | 500-600 | 8 |
| Cu-BTC MOF (Basolite ® C 300) | 1200 | 17 |

Example 6

Ethylene Permeability of an Ecoflex® Film

The framework material of example 1 is used as additive in a biologically de-gradable film with branch name Ecoflex® and the permeability is determined. The following table shows the data obtained.

| wt.-% MOF | Film thickness (μm) | Permeability ($cm^3$ * 1 $\mu m/m^3$/d/bar) |
|---|---|---|
| 0 | 223.3 | 5.00E+04 |
| 0 | 191.8 | 5.16E+04 |
| 1 | 199.8 | 5.59E+04 |
| 1 | 207.3 | 1.01E+05 |
| 1 | 196.4 | 1.18E+05 |
| 1 | 172.8 | 1.23E+05 |
| 5 | 198.1 | 5.63E+04 |
| 5 | 225.2 | 1.14E+05 |
| 5 | 194.4 | 1.20E+05 |
| 5 | 206.4 | 1.13E+05 |

The invention claimed is:

1. A biodegradable material in the form of a foil or a film, where the material comprises a polymer comprising at least one porous metal-organic framework and the at least one porous metal-organic framework comprises at least one at least bidentate organic compound coordinated to at least one metal ion.

2. The material according to claim 1 which is present in the form of a foil.

3. The material according to claim 2, wherein the foil has a thickness of less than 100 μm.

4. The material according to claim 1, wherein the polymer comprises a polyester based on aliphatic and aromatic dicarboxylic acids and aliphatic dihydroxy compounds.

5. The material according to claim 4, wherein the at least one metal ion is comprises an ion selected from the group of metals consisting of Mg, Ca and Al.

6. The material according to claim 1, wherein the at least one at least bidentate organic compound comprises a compound derived from formic acid, acetic acid or an aliphatic dicarboxylic or polycarboxylic acid.

7. The material according to claim 1, wherein the at least one metal-organic framework is present in a proportion of from 0.01% by weight to 10% by weight based on the total weight of the polymer.

8. A food packaging comprising a material according to claim 1.

9. A method of packaging a food comprising using packaging a food in the presence of the material according to claim 1.

10. A method for the absorption of ethene in food packaging comprising providing a porous metal-organic framework in food packaging.

11. The material according to claim 1, wherein the polymer comprises a polyester based on aliphatic and aromatic dicarboxylic acids and aliphatic dihydroxy compounds; the at least one metal ion comprises an ion selected from the group of metals consisting of Mg, Ca and Al; and the at least one at least bidentate organic compound comprises a compound derived from formic acid, acetic acid or an aliphatic dicarboxylic or polycarboxylic acid.

12. The material according to claim 11, wherein the at least one metal-organic framework is present in a proportion of from 0.01% by weight to 10% by weight based on the total weight of the polymer.

13. A food packaging comprising a material according to claim 11.

14. A food packaging comprising a material according to claim 12.

15. A method of packaging a food comprising packaging a food in the presence of the material according to claim 11.

16. A method of packaging a food comprising packaging a food in the presence of the material according to claim 12.

17. The method of claim 10, wherein the porous metal-organic framework comprises: at least one metal ion selected from the group of metals consisting of Mg, Ca and Al; and at least one at least bidentate organic compound derived from formic acid, acetic acid or an aliphatic dicarboxylic or polycarboxylic acid.

* * * * *

UNITED STATES PATENT AND TRADEMARK OFFICE

CERTIFICATE OF CORRECTION

PATENT NO. : 8,569,407 B2
APPLICATION NO. : 13/257787
DATED : October 29, 2013
INVENTOR(S) : Emi Leung et al.

It is certified that error appears in the above-identified patent and that said Letters Patent is hereby corrected as shown below:

In the Claims

In Claim 9, Column 38, Line 14, delete the word "using"

Signed and Sealed this
Twenty-eighth Day of November, 2017

Joseph Matal

Joseph Matal
*Performing the Functions and Duties of the*
*Under Secretary of Commerce for Intellectual Property and*
*Director of the United States Patent and Trademark Office*